United States Patent
Niclass et al.

(10) Patent No.: US 11,233,966 B1
(45) Date of Patent: Jan. 25, 2022

(54) BREAKDOWN VOLTAGE MONITORING FOR AVALANCHE DIODES

(71) Applicant: Apple Inc., Cupertino, CA (US)

(72) Inventors: Cristiano L. Niclass, San Jose, CA (US); Dipayan Das, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 238 days.

(21) Appl. No.: 16/688,932

(22) Filed: Nov. 19, 2019

Related U.S. Application Data

(60) Provisional application No. 62/772,967, filed on Nov. 29, 2018.

(51) Int. Cl.
*H04N 5/378* (2011.01)
*H04N 17/00* (2006.01)

(52) U.S. Cl.
CPC ........... *H04N 5/378* (2013.01); *H04N 17/002* (2013.01)

(58) Field of Classification Search
CPC .............................. H04N 5/378; H04N 17/002
See application file for complete search history.

(56) References Cited

U.S. PATENT DOCUMENTS

| | | |
|---|---|---|
| 6,528,833 B2 | 3/2003 | Lee et al. |
| 6,714,239 B2 | 3/2004 | Guidash |
| 6,905,470 B2 | 6/2005 | Lee et al. |
| 6,931,269 B2 | 8/2005 | Terry |
| 6,982,759 B2 | 1/2006 | Goto |
| 7,075,049 B2 | 7/2006 | Rhodes |
| 7,084,914 B2 | 8/2006 | Blerkom |
| 7,091,466 B2 | 8/2006 | Bock |
| 7,119,322 B2 | 10/2006 | Hong |
| 7,259,413 B2 | 8/2007 | Rhodes |
| 7,262,401 B2 | 8/2007 | Hopper et al. |
| 7,271,836 B2 | 9/2007 | Iizuka et al. |

(Continued)

FOREIGN PATENT DOCUMENTS

| | | |
|---|---|---|
| CN | 101379615 | 3/2009 |
| CN | 103299437 | 9/2013 |

(Continued)

OTHER PUBLICATIONS

Charbon, et al., SPAD-Based Sensors, *TOF Range-Imaging Cameras*, F. Remondino and D. Stoppa (eds.), 2013, Springer-Verlag Berlin Heidelberg, pp. 11-38.

(Continued)

*Primary Examiner* — David P Porta
*Assistant Examiner* — Meenakshi S Sahu
(74) *Attorney, Agent, or Firm* — Brownstein Hyatt Farber Schreck, LLP

(57) ABSTRACT

An image sensor includes an avalanche diode, an avalanche detector circuit, a sample and hold circuit, and a sample collection circuit. The avalanche diode has an output voltage that changes in response to an avalanche event in the avalanche diode. The avalanche detector circuit is configured to generate a sample capture signal in response to detecting the avalanche event. The sample and hold circuit is configured to store a sample of the output voltage in response to receiving the sample capture signal. The sample collection circuit is configured to collect the sample of the output voltage from the sample and hold circuit.

20 Claims, 13 Drawing Sheets

(56) References Cited

U.S. PATENT DOCUMENTS

| | | |
|---|---|---|
| 7,282,028 B2 | 10/2007 | Kim et al. |
| 7,319,218 B2 | 1/2008 | Krymski |
| 7,332,786 B2 | 2/2008 | Altice et al. |
| 7,390,687 B2 | 6/2008 | Boettiger et al. |
| 7,415,096 B2 | 8/2008 | Sherman |
| 7,437,013 B2 | 10/2008 | Anderson |
| 7,443,421 B2 | 10/2008 | Stavely et al. |
| 7,446,812 B2 | 11/2008 | Ando et al. |
| 7,453,131 B2 | 11/2008 | Marshall et al. |
| 7,471,315 B2 | 12/2008 | Silsby et al. |
| 7,502,054 B2 | 3/2009 | Kalapathy et al. |
| 7,525,168 B2 | 4/2009 | Hsieh |
| 7,554,067 B2 | 6/2009 | Zarnowski et al. |
| 7,555,158 B2 | 6/2009 | Park et al. |
| 7,589,316 B2 | 9/2009 | Dunki-Jacobs |
| 7,622,699 B2 | 11/2009 | Sakakibara |
| 7,626,626 B2 | 12/2009 | Panicacci |
| 7,636,109 B2 | 12/2009 | Nakajima et al. |
| 7,667,400 B1 | 2/2010 | Goushcha |
| 7,671,435 B2 | 3/2010 | Ahn |
| 7,696,483 B2 | 4/2010 | Tkaczyk |
| 7,714,292 B2 | 5/2010 | Agarwal et al. |
| 7,728,351 B2 | 6/2010 | Shim |
| 7,733,402 B2 | 6/2010 | Egawa |
| 7,742,090 B2 | 6/2010 | Street et al. |
| 7,764,312 B2 | 7/2010 | Ono et al. |
| 7,773,138 B2 | 8/2010 | Lahav et al. |
| 7,786,543 B2 | 8/2010 | Hsieh |
| 7,796,171 B2 | 9/2010 | Gardner |
| 7,817,198 B2 | 10/2010 | Kang et al. |
| 7,838,956 B2 | 11/2010 | McCarten et al. |
| 7,873,236 B2 | 1/2011 | Li et al. |
| 7,880,785 B2 | 2/2011 | Gallagher |
| 7,884,402 B2 | 2/2011 | Ki |
| 7,906,826 B2 | 3/2011 | Martin et al. |
| 7,952,121 B2 | 3/2011 | Arimoto et al. |
| 7,952,635 B2 | 5/2011 | Lauxtermann |
| 7,982,789 B2 | 7/2011 | Watanabe et al. |
| 8,026,966 B2 | 9/2011 | Altice |
| 8,089,036 B2 | 1/2012 | Manabe |
| 8,089,524 B2 | 1/2012 | Urisaka |
| 8,094,232 B2 | 1/2012 | Kusaka |
| 8,116,540 B2 | 2/2012 | Dean et al. |
| 8,140,143 B2 | 3/2012 | Picard et al. |
| 8,153,947 B2 | 4/2012 | Barbier et al. |
| 8,159,570 B2 | 4/2012 | Negishi |
| 8,159,588 B2 | 4/2012 | Boemler |
| 8,164,669 B2 | 4/2012 | Compton et al. |
| 8,174,595 B2 | 5/2012 | Honda et al. |
| 8,184,188 B2 | 5/2012 | Yaghmal |
| 8,194,148 B2 | 6/2012 | Doida |
| 8,194,165 B2 | 6/2012 | Border et al. |
| 8,222,586 B2 | 7/2012 | Lee |
| 8,227,844 B2 | 7/2012 | Adkisson et al. |
| 8,233,071 B2 | 7/2012 | Takeda |
| 8,259,228 B2 | 9/2012 | Wei et al. |
| 8,324,553 B2 | 12/2012 | Lee |
| 8,338,856 B2 | 12/2012 | Tai et al. |
| 8,340,407 B2 | 12/2012 | Kalman |
| 8,350,940 B2 | 1/2013 | Smith et al. |
| 8,355,117 B2 | 1/2013 | Niclass |
| 8,388,346 B2 | 3/2013 | Rantala et al. |
| 8,400,546 B2 | 3/2013 | Itano et al. |
| 8,456,540 B2 | 6/2013 | Egawa |
| 8,456,559 B2 | 6/2013 | Yamashita et al. |
| 8,508,637 B2 | 8/2013 | Han et al. |
| 8,514,308 B2 | 8/2013 | Itonaga et al. |
| 8,520,913 B2 | 8/2013 | Dean et al. |
| 8,546,737 B2 | 10/2013 | Tian et al. |
| 8,547,388 B2 | 10/2013 | Cheng |
| 8,575,531 B2 | 11/2013 | Hynecek et al. |
| 8,581,992 B2 | 11/2013 | Hamada |
| 8,594,170 B2 | 11/2013 | Members et al. |
| 8,619,163 B2 | 12/2013 | Ogura |
| 8,619,170 B2 | 12/2013 | Mabuchi |
| 8,629,484 B2 | 1/2014 | Ohri et al. |
| 8,634,002 B2 | 1/2014 | Kita |
| 8,637,875 B2 | 1/2014 | Finkelstein et al. |
| 8,648,947 B2 | 2/2014 | Sato et al. |
| 8,653,434 B2 | 2/2014 | Johnson et al. |
| 8,723,975 B2 | 5/2014 | Solhusvik |
| 8,724,096 B2 | 5/2014 | Gosch et al. |
| 8,730,345 B2 | 5/2014 | Watanabe |
| 8,754,983 B2 | 6/2014 | Sutton |
| 8,755,854 B2 | 6/2014 | Addison et al. |
| 8,759,736 B2 | 6/2014 | Yoo |
| 8,760,413 B2 | 6/2014 | Peterson et al. |
| 8,767,104 B2 | 7/2014 | Makino et al. |
| 8,803,990 B2 | 8/2014 | Smith |
| 8,810,703 B2 | 8/2014 | Machida |
| 8,817,154 B2 | 8/2014 | Manabe et al. |
| 8,874,377 B1 | 10/2014 | Sickenberger |
| 8,879,686 B2 | 11/2014 | Okada |
| 8,902,330 B2 | 12/2014 | Theuwissen |
| 8,902,341 B2 | 12/2014 | Mabuchi |
| 8,908,073 B2 | 12/2014 | Minagawa et al. |
| 8,923,994 B2 | 12/2014 | Laikari et al. |
| 8,934,030 B2 | 1/2015 | Kim et al. |
| 8,936,552 B2 | 1/2015 | Kateraas et al. |
| 8,946,610 B2 | 2/2015 | Iwabuchi et al. |
| 8,982,237 B2 | 3/2015 | Chen |
| 9,006,641 B2 | 4/2015 | Drader |
| 9,017,748 B2 | 4/2015 | Spelman et al. |
| 9,041,837 B2 | 5/2015 | Li |
| 9,054,009 B2 | 6/2015 | Oike et al. |
| 9,058,081 B2 | 6/2015 | Baxter |
| 9,066,017 B2 | 6/2015 | Geiss |
| 9,066,660 B2 | 6/2015 | Watson et al. |
| 9,088,727 B2 | 7/2015 | Trumbo |
| 9,094,623 B2 | 7/2015 | Kawaguchi |
| 9,099,604 B2 | 8/2015 | Roy et al. |
| 9,100,597 B2 | 8/2015 | Hu |
| 9,106,859 B2 | 8/2015 | Kizuna et al. |
| 9,131,171 B2 | 9/2015 | Aoki |
| 9,151,829 B2 | 10/2015 | Campbell |
| 9,154,750 B2 | 10/2015 | Pang |
| 9,160,949 B2 | 10/2015 | Zhang et al. |
| 9,164,144 B2 | 10/2015 | Dolinsky |
| 9,176,241 B2 | 11/2015 | Frach |
| 9,178,100 B2 | 11/2015 | Webster et al. |
| 9,209,320 B1 | 12/2015 | Webster |
| 9,225,948 B2 | 12/2015 | Hasegawa |
| 9,232,150 B2 | 1/2016 | Kleekajai et al. |
| 9,232,161 B2 | 1/2016 | Suh |
| 9,235,267 B2 | 1/2016 | Burrough et al. |
| 9,257,589 B2 | 2/2016 | Niclass et al. |
| 9,270,906 B2 | 2/2016 | Peng et al. |
| 9,276,031 B2 | 3/2016 | Wan |
| 9,277,144 B2 | 3/2016 | Kleekajai et al. |
| 9,287,304 B2 | 3/2016 | Park et al. |
| 9,288,380 B2 | 3/2016 | Nomura |
| 9,288,404 B2 | 3/2016 | Papiashvili |
| 9,293,500 B2 | 3/2016 | Sharma et al. |
| 9,312,401 B2 | 4/2016 | Webster |
| 9,313,434 B2 | 4/2016 | Dutton et al. |
| 9,319,611 B2 | 4/2016 | Fan |
| 9,331,116 B2 | 5/2016 | Webster |
| 9,344,649 B2 | 5/2016 | Bock |
| 9,354,332 B2 | 5/2016 | Zwaans |
| 9,392,237 B2 | 7/2016 | Toyoda |
| 9,417,326 B2 | 8/2016 | Niclass et al. |
| 9,431,439 B2 | 8/2016 | Soga et al. |
| 9,438,258 B1 | 9/2016 | Yoo |
| 9,445,018 B2 | 9/2016 | Fettig et al. |
| 9,448,110 B2 | 9/2016 | Wong |
| 9,450,007 B1 | 9/2016 | Motta et al. |
| 9,451,887 B2 | 9/2016 | Watson et al. |
| 9,467,553 B2 | 10/2016 | Heo et al. |
| 9,473,706 B2 | 10/2016 | Malone et al. |
| 9,478,030 B1 | 10/2016 | Lecky |
| 9,479,688 B2 | 10/2016 | Ishii |
| 9,490,285 B2 | 11/2016 | Itonaga |
| 9,503,616 B2 | 11/2016 | Taniguchi et al. |
| 9,516,244 B2 | 12/2016 | Borowski |

(56) References Cited

U.S. PATENT DOCUMENTS

| | | | |
|---|---|---|---|
| 9,538,106 B2 | 1/2017 | McMahon et al. | |
| 9,549,099 B2 | 1/2017 | Fan | |
| 9,560,339 B2 | 1/2017 | Borowski | |
| 9,596,420 B2 | 3/2017 | Fan et al. | |
| 9,639,063 B2 | 5/2017 | Dutton et al. | |
| 9,661,308 B1 | 5/2017 | Wang et al. | |
| 9,685,576 B2 | 6/2017 | Webster | |
| 9,686,485 B2 | 6/2017 | Agranov et al. | |
| 9,700,240 B2 | 7/2017 | Letchner et al. | |
| 9,741,754 B2 | 8/2017 | Li et al. | |
| 9,749,556 B2 | 8/2017 | Fettig et al. | |
| 9,774,318 B2 | 9/2017 | Song | |
| 9,831,283 B2 | 11/2017 | Shepard et al. | |
| 9,857,469 B2 | 1/2018 | Oggier et al. | |
| 9,870,053 B2 | 1/2018 | Modarres et al. | |
| 9,888,198 B2 | 2/2018 | Mauritzson et al. | |
| 9,915,733 B2 | 3/2018 | Fried et al. | |
| 9,921,299 B2 | 3/2018 | Kalscheur et al. | |
| 9,935,231 B2 | 4/2018 | Roehrer | |
| 9,939,316 B2 * | 4/2018 | Scott | G01J 1/0266 |
| 9,952,323 B2 | 4/2018 | Deane | |
| 9,973,678 B2 | 5/2018 | Mandelli et al. | |
| 9,985,163 B2 | 5/2018 | Moore | |
| 10,026,772 B2 | 7/2018 | Shinohara | |
| 10,067,224 B2 | 9/2018 | Moore | |
| 10,107,914 B2 | 10/2018 | Kalscheur et al. | |
| 10,120,446 B2 | 11/2018 | Pance et al. | |
| 10,145,678 B2 | 12/2018 | Wang et al. | |
| 10,153,310 B2 | 12/2018 | Zhang et al. | |
| 10,217,889 B2 | 2/2019 | Dhulla et al. | |
| 10,267,901 B2 | 4/2019 | Drader | |
| 10,305,247 B2 | 5/2019 | Bills et al. | |
| 10,324,171 B2 | 6/2019 | Niclass et al. | |
| 10,334,181 B2 | 6/2019 | Guenter | |
| 10,338,221 B2 | 7/2019 | Lee et al. | |
| 10,416,293 B2 | 9/2019 | Buckley | |
| 10,438,987 B2 | 10/2019 | Mandai et al. | |
| 10,451,736 B2 | 10/2019 | Stutz | |
| 10,495,736 B2 | 12/2019 | Zhuang et al. | |
| 10,651,332 B2 | 5/2020 | Moussy | |
| 10,795,001 B2 | 10/2020 | Niclass et al. | |
| 10,802,148 B2 | 10/2020 | Lee et al. | |
| 2010/0159632 A1 | 6/2010 | Rhodes et al. | |
| 2012/0162632 A1 | 6/2012 | Dutton | |
| 2014/0231630 A1 | 8/2014 | Rae et al. | |
| 2017/0052065 A1 | 2/2017 | Sharma et al. | |
| 2017/0082746 A1 | 3/2017 | Kubota et al. | |
| 2018/0090526 A1 | 3/2018 | Mandai et al. | |
| 2018/0209846 A1 | 7/2018 | Mandai et al. | |
| 2018/0341009 A1 | 11/2018 | Niclass et al. | |
| 2019/0018119 A1 | 1/2019 | Laifenfeld et al. | |
| 2019/0198701 A1 | 6/2019 | Moussy | |
| 2020/0278429 A1 | 9/2020 | Mandai et al. | |
| 2020/0286946 A1 | 9/2020 | Mandai et al. | |

FOREIGN PATENT DOCUMENTS

| | | |
|---|---|---|
| CN | 103779437 | 5/2014 |
| CN | 104103655 | 10/2014 |
| CN | 104779259 | 7/2015 |
| CN | 104810377 | 7/2015 |
| CN | 105185796 | 12/2015 |
| CN | 105489624 | 4/2016 |
| DE | 102010060527 | 4/2012 |
| EP | 0727824 | 8/1995 |
| EP | 2787531 | 10/2014 |
| JP | 2004319576 | 11/2004 |
| JP | 2012038981 | 2/2012 |
| JP | 2012169530 | 9/2012 |
| JP | 2014081254 | 5/2014 |
| JP | 2014225647 | 12/2014 |
| JP | 2015041746 | 3/2015 |
| JP | 2016145776 | 8/2016 |
| WO | WO 12/011095 | 1/2012 |
| WO | WO 12/032353 | 3/2012 |
| WO | WO 17/112416 | 6/2017 |
| WO | WO 20/045123 | 3/2020 |

OTHER PUBLICATIONS

Cox, "Getting histograms with varying bin widths," http://www.stata.com/support/faqs/graphics/histograms-with-varying-bin-widths/, Nov. 13, 2017, 5 pages.

Gallivanoni, et al., "Progress n Quenching Circuits for Single Photon Avalanche Diodes," IEEE Transactions on Nuclear Science, vol. 57, No. 6, Dec. 2010, pp. 3815-3826.

Jahromi et al., "A Single Chip Laser Radar Receiver with a 9×9 SPAD Detector Array and a 10-channel TDC," 2013 Proceedings of the ESSCIRC, IEEE, Sep. 14, 2015, pp. 364-367.

Leslar, et al., "Comprehensive Utilization of Temporal and Spatial Domain Outlier Detection Methods for Mobile Terrestrial LiDAR Data," *Remote Sensing*, 2011, vol. 3, pp. 1724-1742.

Mota, et al., "A flexible multi-channel high-resolution Time-to-Digital Converter ASIC," *Nuclear Science Symposium Conference Record IEEE*, 2000, Engineering School of Geneva, Microelectronics Lab, Geneva, Switzerland, 8 pages.

Niclass, et al., "Design and Characterization of a CMOS 3-D Image Sensor Based on Single Photon Avalanche Diodes," *IEEE Journal of Solid-State Circuits*, vol. 40, No. 9, Sep. 2005, pp. 1847-1854.

Shin, et al., "Photon-Efficient Computational 3D and Reflectivity Imaging with Single-Photon Detectors," IEEE International Conference on Image Processing, Paris, France, Oct. 2014, 11 pages.

Tisa, et al., "Variable-Load Quenching Circuit for single-photon avalanche diodes," Optics Express, vol. 16, No. 3, Feb. 4, 2008, pp. 2232-2244.

Ullrich, et al., "Linear LIDAR versus Geiger-mode LIDAR: Impact on data properties and data quality," *Laser Radar Technology and Applications XXI*, edited by Monte D. Turner, Gary W. Kamerman, Proc. of SPIE, vol. 9832, 983204, 2016, 17 pages.

Kindt, et al., "A silicon avalanche photodiode for single optical photon counting in the Geiger mode," Sensors and Actuators A: Physical, Elsevier BV, NL, vol. 60, No. 1-3, May 1, 1997, pp. 98-102.

\* cited by examiner

BREAKDOWN VOLTAGE MONITORING FOR AVALANCHE DIODES

CROSS-REFERENCE TO RELATED APPLICATION

This application is a nonprovisional of and claims the benefit under 35 U.S.C. § 119(e) of U.S. Provisional Patent Application No. 62/772,967, filed Nov. 29, 2018, and entitled "Breakdown Voltage Monitoring for Avalanche Diodes," the content of which is incorporated by reference as if fully disclosed herein.

FIELD

The described embodiments generally relate to monitoring (or estimating) the breakdown voltages of avalanche diodes.

BACKGROUND

Avalanche diodes are used in a variety of applications, including: as voltage references, for surge protection, or in imaging applications. One type of avalanche diode—the single-photon avalanche diode (SPAD)—may be used in three-dimensional (3D) imaging applications (e.g., light detection and ranging (LIDAR) applications).

An important characteristic of an avalanche diode is its breakdown voltage. However, there are very few methods for determining an avalanche diode's breakdown voltage, and existing methods rely on complex, time-consuming calibration processes, and are sensitive to various environmental effects.

SUMMARY

Embodiments of the systems, devices, methods, and apparatus described in the present disclosure are directed to monitoring (or estimating) the breakdown voltages of avalanche diodes.

In a first aspect, the present disclosure describes an image sensor. The image sensor may include an avalanche diode, an avalanche detector circuit, a sample and hold circuit (e.g., a track and hold circuit), and a sample collection circuit. The avalanche diode may have an output voltage that changes in response to an avalanche event in the avalanche diode. The avalanche detector circuit may be configured to generate a sample capture signal in response to detecting the avalanche event. The sample and hold circuit may be configured to store a sample of the output voltage in response to receiving the sample capture signal. The sample collection circuit may be configured to collect the sample of the output voltage from the sample and hold circuit.

In another aspect, the present disclosure describes another image sensor. The image sensor may include an array of imaging pixels including avalanche diodes, an array of breakdown voltage monitoring pixels including avalanche diodes, an integrator circuit coupled to each of the breakdown voltage monitoring pixels, a breakdown voltage estimator circuit, and a control circuit configured to address a first breakdown voltage monitoring pixel in the array of breakdown voltage monitoring pixels. The first breakdown voltage monitoring pixel may include a first avalanche diode having a first output voltage. While the first breakdown voltage monitoring pixel is addressed, the integrator circuit may integrate samples of the first output voltage obtained in response to avalanche events occurring during an exposure period of the first avalanche diode. The breakdown voltage estimator circuit may be configured to estimate a breakdown voltage of the avalanche diodes of the imaging pixels using the integrated samples of the first output voltage.

In still another aspect of the disclosure, a method of monitoring an avalanche diode having an output voltage is described. The method may include exposing the avalanche diode to photons, detecting an avalanche event that occurs in the avalanche diode in response to at least one of the photons impinging on the avalanche diode, capturing and storing a sample of the output voltage in response to detecting the avalanche event, and outputting the stored sample of the output voltage to downstream circuitry through a buffer.

In addition to the aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

Figure 1:
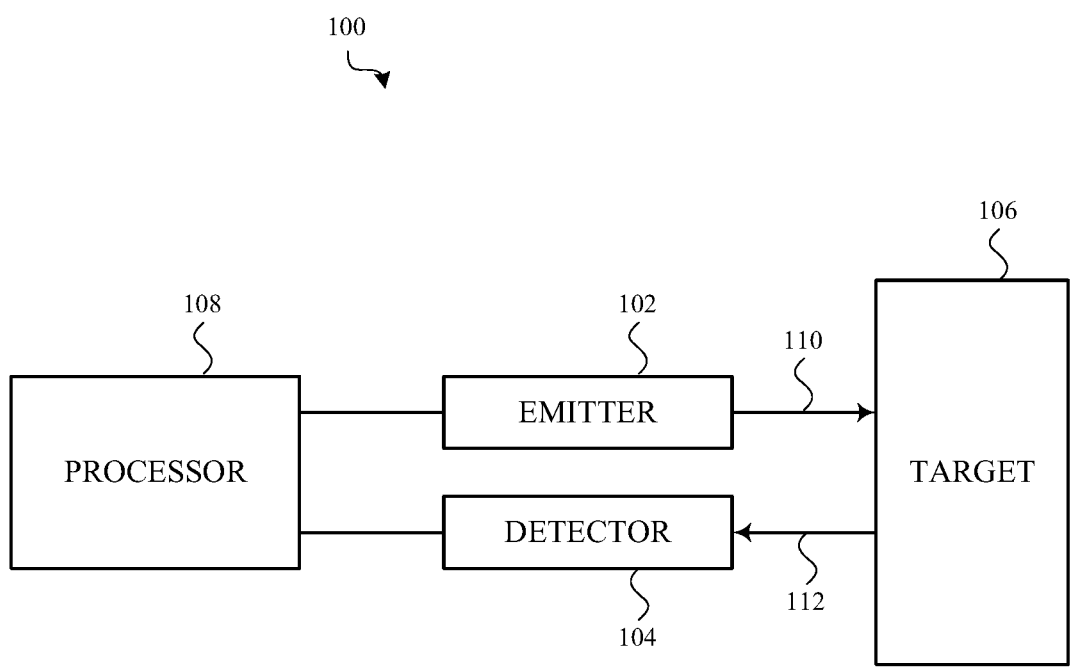
FIG. 1 shows an example system including a detector that uses avalanche diodes (e.g., SPADs)

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments and appended claims.

Described herein are techniques that enable the monitoring (or estimating) of breakdown voltages of avalanche diodes. In some cases, a breakdown voltage may be monitored (or estimated) by monitoring (or estimating) an error in an avalanche diode output voltage. The techniques are sometimes described in the context of a SPAD, but may be used to monitor or estimate the breakdown voltage of any avalanche diode.

Existing and emerging consumer applications have created an increasing need for real-time 3D imaging applications (e.g., LIDAR applications). These imaging applications may rely on SPAD-based image sensors. A SPAD-based image sensor may include an array of imaging pixels, with each pixel including a SPAD. A SPAD of an imaging pixel may be charged (e.g., reverse-biased to a voltage above its breakdown voltage). When a photon (or small number of photons) impinges on the charged SPAD, the SPAD's p-n junction may experience an avalanche event that allows a sudden change in current flow through the SPAD.

A SPAD-based image sensor may be used in conjunction with one or more photon sources (e.g., visible or invisible electromagnetic radiation sources) that emit short duration bursts of photons into a field of view (FoV), toward a target. Operation of the photon source(s) and SPAD-based image sensor's pixels may be synchronized so that the pixels are able to detect the arrival times of photons that are: emitted by the photon source(s), reflected from a target, and received by the pixels. The arrival times of photons are determined based on the timings of avalanche events occurring in the SPADs of the pixels. Given the timing of a photon burst and a subsequent avalanche event in a predetermined pixel of the SPAD-based image sensor, a roundtrip time-of-flight (ToF) of the photon burst may be determined, and the travel speed of the photon burst (e.g., the speed of light) may be used to determine a distance between the predetermined pixel and the target.

The precision of a ToF measured using a SPAD, and the determination of a subsequent distance determination, is dependent on the accuracy of a control loop that regulates a high voltage supply used to reverse-bias the SPAD. The high voltage supply needs to track the SPAD's breakdown voltage, and should ideally be insensitive to changes in SPAD junction temperature and illumination (with illumination generally referring to any type of photon, whether visible or invisible, that may affect the operation of the SPAD, regardless of whether the effect triggers an avalanche event in the SPAD).

Currently known methods of monitoring the breakdown voltage of a SPAD have shown sensitivity to changes in pixel manufacturing process, junction temperature, and illumination, which sensitivities can be difficult to calibrate for and affect the accuracy of breakdown voltage estimation. Currently known methods are also relatively expensive, and their circuitry can consume significant chip area. New techniques for monitoring (or estimating) an avalanche diode's breakdown voltage are therefore needed.

In accordance with some of the described techniques, the output voltage of an avalanche diode (e.g., a SPAD) within a breakdown voltage monitoring pixel may be sampled and locally stored within the breakdown voltage monitoring pixel. In some embodiments, the sample may be stored on a capacitor. The sample may be acquired and stored immediately after an avalanche event (or very soon thereafter). The timing of sample acquisition may in some cases be determined using a monostable circuit that is triggered by a change in the output voltage due to an avalanche event. In some embodiments, the monostable circuit may be adjustable (e.g., have an adjustable delay), or a delay circuit proceeding the monostable circuit may have an adjustable delay.

The sampled output voltage (i.e., a discrete sample) may be read out of the pixel through a buffer and integrated with other samples of the same pixel's avalanche diode output voltage. In some embodiments, samples may be integrated using a non-inverting, parasitic-insensitive, switched capacitor integrator circuit. Samples of an avalanche diode output voltage obtained from a single breakdown voltage monitoring pixel during an exposure period of the pixel's avalanche diode may be integrated. The ratio of the integrating capacitor and the in-pixel storage capacitor may be configured such that output voltage samples acquired for a statistically significant number of avalanche events may be integrated. Circuitry may be provided for counting the number of avalanche events during an exposure period of an avalanche diode, and the magnitude of the integrated samples may be divided by the number of avalanche events to estimate an average breakdown voltage of the avalanche diode. This can reduce the effects of avalanche noise and photocurrent (e.g., dark current) on the estimation. In some embodiments, the circuitry that counts the number of avalanche events may include an edge counter. In some embodiments, the counts of avalanche events occurring during a predetermined exposure period, but in different breakdown voltage monitoring pixels, may be compared to determine variability of photon exposure in different breakdown voltage monitoring pixels. In some embodiments, an average breakdown voltage may be estimated for an image sensor using the average breakdown voltage(s) of a best-exposed set of breakdown voltage monitoring pixels, or all breakdown voltage monitoring pixels, or a single breakdown voltage monitoring pixel.

The described techniques may be better suited for monitoring (or estimating) an avalanche diode's breakdown voltage in an uncontrolled (or less controlled) environment, may enable faster breakdown voltage estimation, may provide better accuracy when estimating breakdown voltages, may obviate the need for complex calibration procedures, may consume less area, and/or may be implemented at lower cost. The described techniques may also enable the deployment of a greater number of breakdown voltage monitoring pixels in an image sensor (e.g., because the number of breakdown voltage monitoring pixels deployed does not bias breakdown voltage estimation toward a highest or lowest breakdown voltage within an array of breakdown voltage monitoring pixels).

These and other embodiments are described with reference to FIGS. 1-12. However, those skilled in the art will readily appreciate that the detailed description given herein with respect to these figures is for explanatory purposes only and should not be construed as limiting.

Directional terminology, such as "top", "bottom", "upper", "lower", "front", "back", "over", "under", "above", "below", "left", "right", etc. is used with reference to the orientation of some of the components in some of the figures described below. Because components in various embodiments can be positioned in a number of different orientations, directional terminology is used for purposes of illustration only and is in no way limiting. The directional terminology is intended to be construed broadly, and therefore should not be interpreted to preclude components being oriented in different ways. The use of alternative terminology, such as "or", is intended to indicate different combinations of the alternative elements. For example, A or B is intended to include, A, or B, or A and B.

FIG. 1 shows an example system 100, including a detector 104 that uses avalanche diodes (e.g., SPADs). The system 100 may include an emitter 102 and a detector 104 positioned in close proximity to one another, and relatively far (compared to the distance between the emitter 102 and detector 104) from a target 106. In some embodiments, the emitter 102 and detector 104 may be provided as a single module. The emitter 102 may be positioned to emit photons towards the target 106, or into a FoV, and the detector 104 may be positioned to detect reflections of the photons from the target 106.

A processor 108 may be operably connected to the emitter 102 and detector 104, and may cause the emitter 102 to emit photons towards the target 106 (with the emitted photons being represented by the arrow 110). Photons that are reflected from the target 106 toward the detector 104 (represented by the arrow 112) may be detected by the detector 104. In particular, the reflected photons may cause avalanche events in various pixels of the detector 104, and the timing(s) of such avalanche events may be recorded and compared to the time(s) when photons were emitted. The processor 108 may receive signals (e.g., times of avalanche events) output by the detector 104, and in some cases may receive photon emission times from the emitter 102, and may determine ToFs of photons emitted by the emitter 102 and received by pixels of the detector 104. The ToFs may be used to determine distances between individual pixels of the detector 104 and the target 106. The distances can be used to generate a 3D image of the target 106.

The described components and operation of the system 100 are exemplary. In alternative embodiments, the system 100 may include a different combination or configuration of components, or may perform additional or alternative functions.

The system 100 may be used as part of an electronic device, such as, in an image sensor within a smart phone (e.g., in an image sensor within a camera or biometric sensor (e.g., a facial recognition sensor) of the smart phone), or in a navigation system of a motor vehicle.

Figure 2:
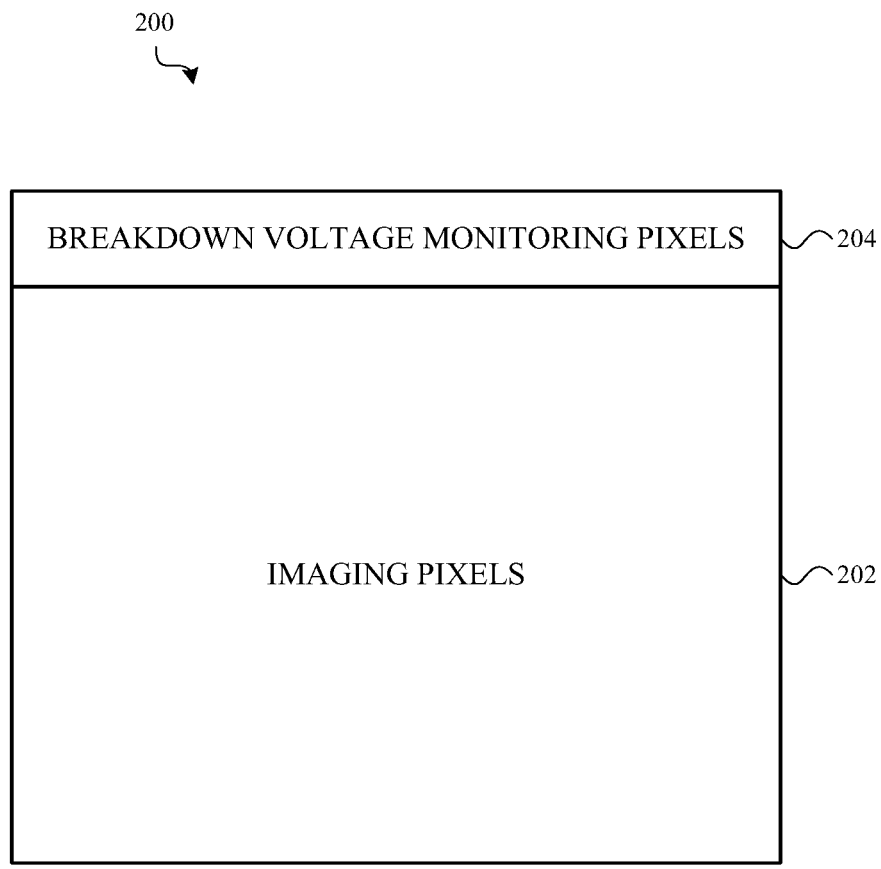
FIG. 2 shows an example of an image sensor that may be used in the detector shown in FIG. 1.

FIG. 2 shows an example of an image sensor 200, which image sensor is an example of the detector described with reference to FIG. 1. The image sensor 200 includes an array of imaging pixels 202 and an array of breakdown voltage monitoring pixels 204. Each of the arrays may include a plurality of pixels, with some or all of the pixels including an avalanche diode (e.g., a SPAD). In alternative embodiments, the array of breakdown voltage monitoring pixels 204 may be a single breakdown voltage monitoring pixel.

Although the array of imaging pixels 202 and array of breakdown voltage monitoring pixels 204 are shown to be adjacent, the arrays could alternatively overlap (e.g., partially or fully overlap).

The breakdown voltage monitoring pixels may be used to estimate the breakdown voltages of not only the breakdown voltage monitoring pixels, but also the breakdown voltages of the imaging pixels.

Figure 3A:
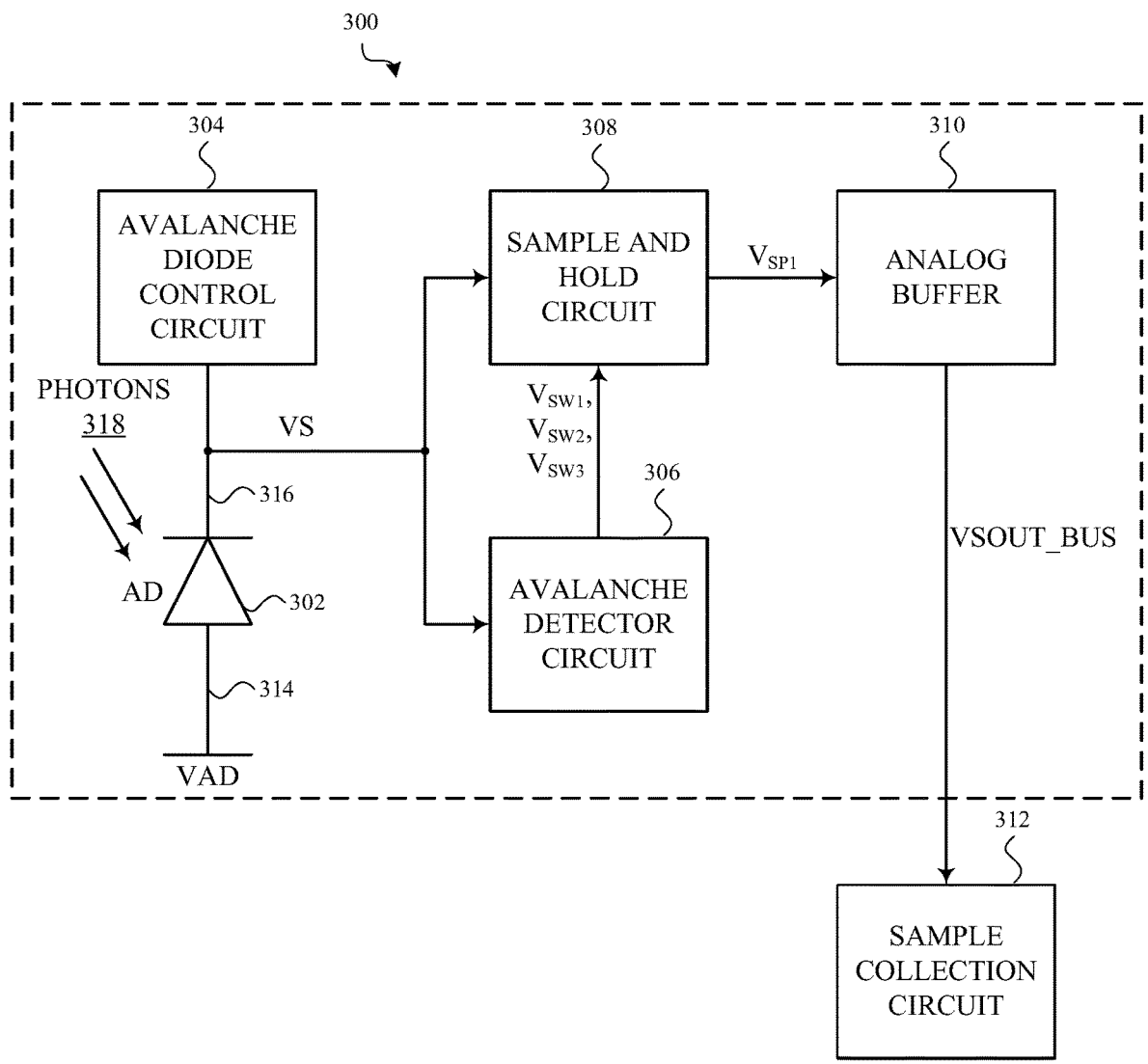
FIGS. 3A and 3B show examples of breakdown voltage monitoring pixels that may be used in the image sensor shown in FIG. 2.
Figure 3B:
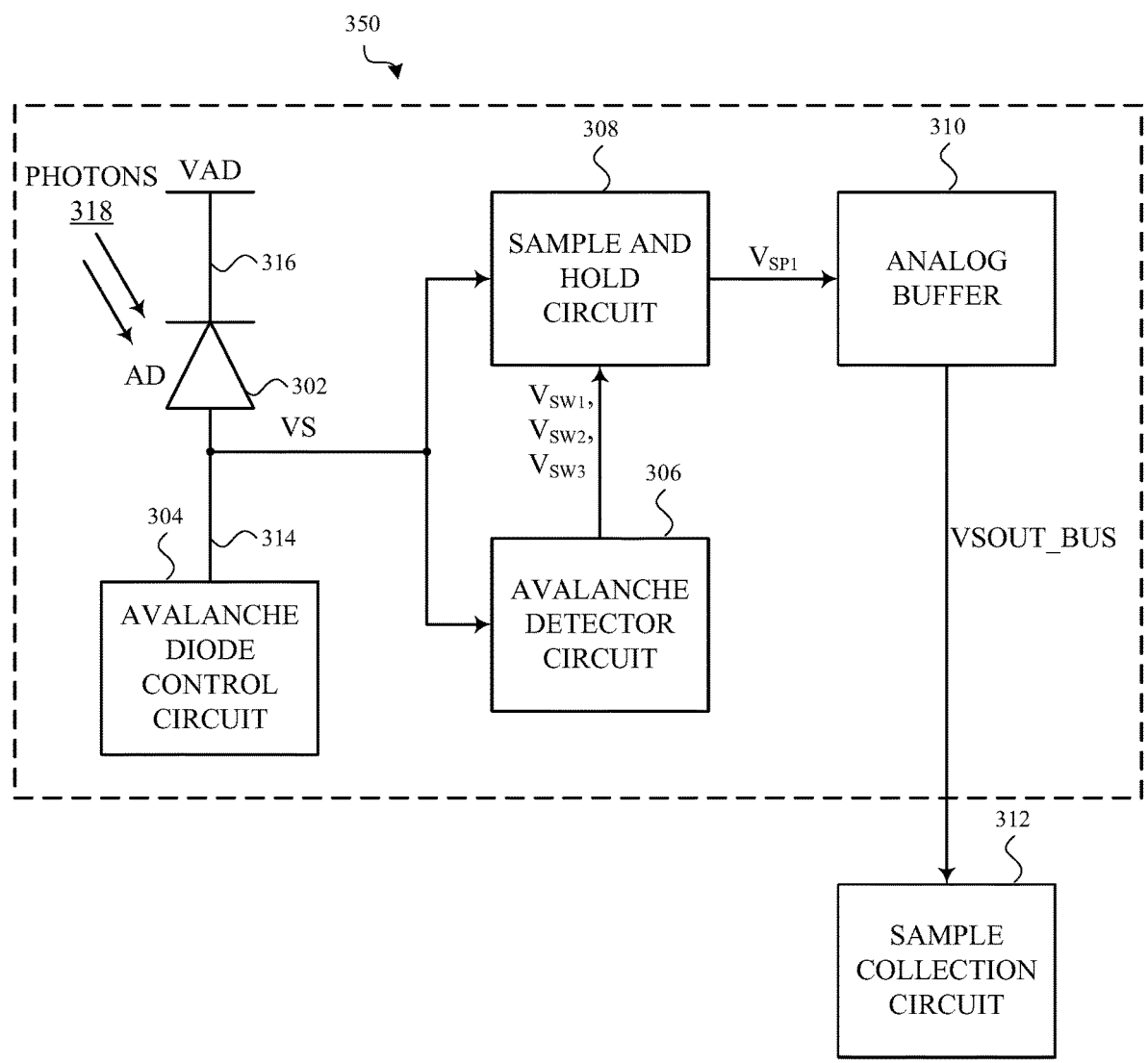

Turning now to FIGS. 3A and 3B, there are shown examples of breakdown voltage monitoring pixels 300 and 350. The breakdown voltage monitoring pixels 300, 350 are examples of the breakdown voltage monitoring pixels in the array of breakdown voltage monitoring pixels 204 described with reference to FIG. 2.

With reference to FIG. 3A, the breakdown voltage monitoring pixel 300 may include an avalanche diode 302, an avalanche diode control circuit 304, an avalanche detector circuit 306, a sample and hold circuit 308, and an analog buffer 310. In some alternative embodiments, one or more of the circuits 304, 306, 308, or 310 may not be provided, or may be combined with other circuits. In some alternative embodiments, the breakdown voltage monitoring pixel 300 may include additional circuitry.

The avalanche diode 302 may take various forms, and in some examples may be a SPAD. The avalanche diode 302 may have an anode 314 and a cathode 316. In FIG. 3, the voltage of the anode 314 (or anode voltage) is labeled VAD, and the voltage of the cathode 316 (or cathode voltage) is labeled VS. In some cases, the anode 314 may be biased by a negative high voltage supply (e.g., VAD=−15 V), and the cathode 316 may be biased by a positive voltage supply, such that the avalanche diode 302 is reverse-biased to a voltage that exceeds the breakdown voltage of the avalanche diode 302. When the avalanche diode 302 is biased in this manner, it can be considered charged and ready to detect photons.

The cathode voltage (VS) may be considered the output voltage of the avalanche diode 302. When photons 318 (and in some cases a single photon) impinge on the avalanche diode 302, an avalanche event may be triggered in the avalanche diode 302. An avalanche event causes the avalanche diode 302 to conduct current and leads to a change (e.g., a sudden drop) in the cathode or output voltage (VS). The avalanche detector circuit 306 may detect the avalanche event by detecting the drop in the cathode voltage. In response to detecting the avalanche event, the avalanche detector circuit 306 may generate a sample capture signal ($V_{SW1}$).

The sample capture signal may be received by the sample and hold circuit 308, which may be configured to store a sample of the cathode voltage in response to receiving the sample capture signal. The sample and hold circuit 308 may store one sample of the cathode voltage at a time. In some embodiments, the sample and hold circuit 308 may be configured as a track and hold circuit.

The sample and hold circuit 308 may be coupled to a sample collection circuit 312, and in some cases may be coupled to the sample collection circuit 312 via an analog buffer 310 (e.g., via a first node ($V_{SP1}$) connecting the sample and hold circuit 308 to the analog buffer 310, and via a second node (VSOUT_BUS) connecting the analog buffer 310 to the sample collection circuit 312). The sample collection circuit 312 may be outside the breakdown voltage monitoring pixel 300, and in some cases may be shared by a plurality of breakdown voltage monitoring pixels (e.g., the sample collection circuit 312 may be connected to one of a plurality of breakdown voltage monitoring pixels at a time).

Alternatively, the sample collection circuit 312 may be incorporated into the breakdown voltage monitoring pixel 300, and each breakdown voltage monitoring pixel may be provided its own sample collection circuit 312. The sample collection circuit 312 may be configured to collect samples of the cathode voltage from the sample and hold circuit 308. For example, a first sample of the cathode voltage may be temporarily stored in the sample and hold circuit 308, then collected by the sample collection circuit 312. A second sample of the cathode voltage may then be temporarily stored in the sample and hold circuit 308, and then collected by the sample collection circuit 312. In some cases, the sample collection circuit 312 may be configured to integrate samples of the cathode voltage collected for an exposure period of the avalanche diode 302. The exposure period may span multiple avalanche events in the avalanche diode 302.

With reference to FIG. 3B, the breakdown voltage monitoring pixel 350 may include an avalanche diode 302, an avalanche diode control circuit 304, an avalanche detector circuit 306, a sample and hold circuit 308, and an analog buffer 310, which circuits or components may be configured similarly to those shown in FIG. 3A or in other ways. In some alternative embodiments, one or more of the circuits 304, 306, 308, or 310 may not be provided, or may be combined with other circuits. In some alternative embodiments, the breakdown voltage monitoring pixel 350 may include additional circuitry.

In FIG. 3B, the voltage of the cathode 316 (or cathode voltage) is labeled VAD, and the voltage of the anode 314 (or anode voltage) is labeled VS. In some cases, the cathode 316 may be biased by a positive high voltage supply, and the anode 314 may be biased by a negative voltage supply. When the avalanche diode 302 is reverse-biased in this manner, it can be considered charged and ready to detect photons. In the breakdown voltage monitoring pixel 350, the anode voltage (VS) may be considered the output voltage of the avalanche diode 302.

Figure 4:
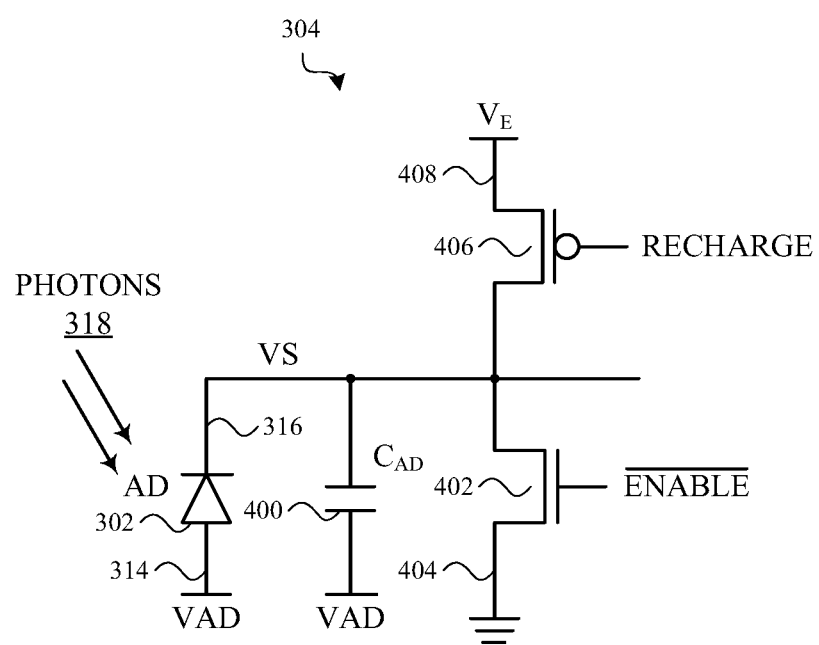
FIG. 4 shows an example of an avalanche diode control circuit that may be used in the breakdown voltage monitoring pixel shown in FIG. 3A.
Figure 5:
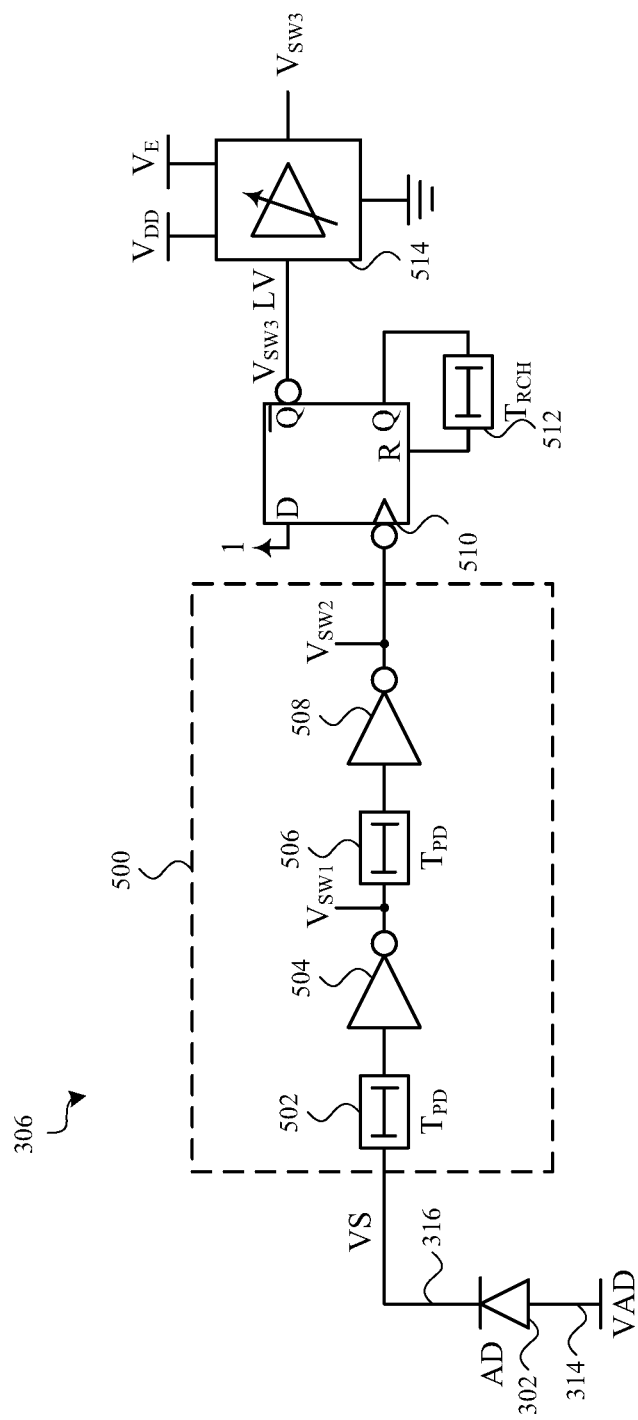
FIG. 5 shows an example of an avalanche detector circuit that may be used in the breakdown voltage monitoring pixel shown in FIG. 3A.
Figure 6:
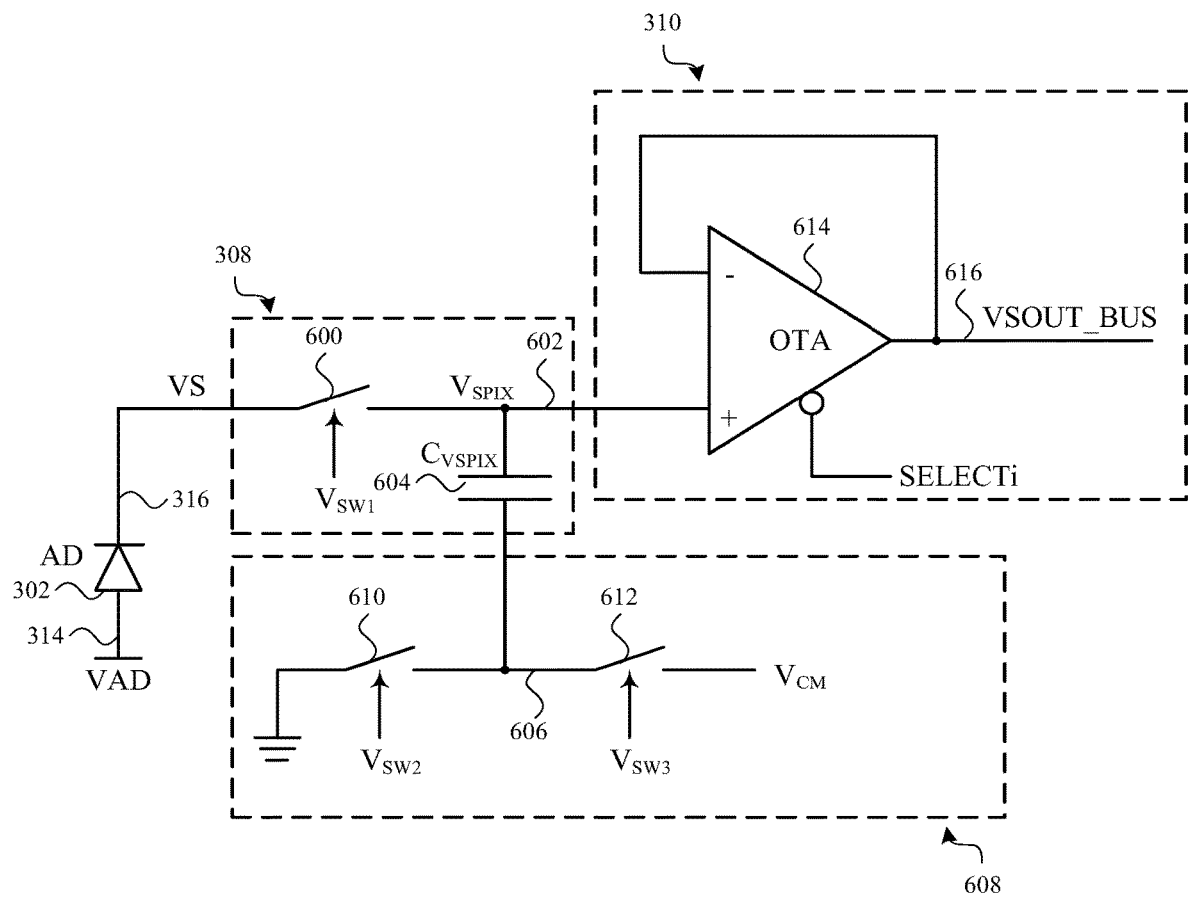
FIG. 6 shows examples of a sample and hold circuit and analog buffer that may be used in the breakdown voltage monitoring pixel shown in FIG. 3A.

FIGS. 4-6 show example embodiments of the avalanche diode control circuit 304 (FIG. 4), avalanche detector circuit 306 (FIG. 5), sample and hold circuit 308 (FIG. 6), and analog buffer 310 (FIG. 6) shown in FIG. 3A. As shown in FIG. 4, a first transistor 402 may be coupled between the cathode 316 and a low voltage node 404 (e.g., ground) via its source and drain, and may receive an enable signal ($\overline{\text{ENABLE}}$) at its gate. A second transistor 406 may be coupled between a high voltage node 408 and the cathode 316 via its source and drain, and may receive a recharge signal (RECHARGE) at its gate. The cathode 316 may be associated with one or more parasitic capacitances 400 (collectively represented by the capacitance $C_{AD}$ 400), which parasitic capacitances may result from the avalanche diode's junction/terminal capacitances, drain terminal capacitances of the first and second transistors 402, 406, and so on.

The first transistor 402 may be used to enable or disable the avalanche diode 302 in response to the state of the enable signal ($\overline{\text{ENABLE}}$). When the enable signal is in a high state, charge on the cathode 316 may be drained (e.g., the avalanche diode 302 may be quenched), and the avalanche diode 302 and its readout circuitry may be disabled. When the enable signal is in a low state, the avalanche diode 302 may be recharged, and the avalanche diode 302 and its readout circuitry may be enabled. When the recharge signal (RECHARGE) is in a low state, the cathode voltage may be pulled to the voltage ($V_E$) of the high voltage node 408 through charging the capacitance associated with the VS node. When the recharge signal is in a high state, the avalanche diode 302 may be enabled (or recharged) to sense photons 318. When photons 318 impinge on the avalanche diode 302, the avalanche diode 302 may conduct current and discharge the VS node.

For reference, FIG. 4 shows the avalanche diode 302 of the breakdown voltage monitoring pixel 300 described with reference to FIG. 3A, but does not show the entirety of the breakdown voltage monitoring pixel 300.

FIG. 5 shows an example of the avalanche detector circuit 306 described with reference to FIG. 3A. For reference, FIG. 5 also shows the avalanche diode 302 of the breakdown voltage monitoring pixel 300 described with reference to FIG. 3A, but does not show the entirety of the breakdown voltage monitoring pixel 300. The avalanche detector circuit 306 may receive the cathode voltage (VS) as an input signal and produce one or more output signals. As described with reference to FIG. 3A, the output signals may include a sample capture signal ($V_{SW1}$) and/or other signals (e.g., $V_{SW2}$ and $V_{SW3}$). In some embodiments, the avalanche detector circuit 306 may include a buffer and/or a delay circuit 500 (e.g., an inverter chain or buffer chain). The avalanche detector circuit 306 may also include a monostable circuit 510 and/or a level shifter circuit 514.

As shown in FIG. 5, the cathode voltage (VS) may be received by a component or set of components 502 associated with a delay $T_{PD}$ (e.g., an inverter or chain of inverters that inverts the cathode voltage). The component or set of components 502 may provide a delayed and inverted cathode voltage to an inverter 504, which inverter 504 has an output that tracks the output of the VS node after a delay. The first inverter 504 may be configured to transition the sample capture signal $V_{SW1}$ from high-to-low after the cathode voltage (VS) reaches its low voltage, or after the cathode voltage reaches a particular voltage between its high and low voltage (e.g., after VS drops sufficiently to indicate a descending edge of the VS waveform, which descending edge indicates the occurrence of an avalanche event in the avalanche diode 302). In some cases, the delay $T_{PD}$ 502 may be configured to account for the time it takes VS to drop from a predetermined voltage along its high-to-low transition to its low voltage.

The output of the inverter 504 may be received by another component or set of components 506 associated with a delay $T_{PD}$ (e.g., an inverter or chain of inverters that inverts the output of the inverter 504). The component or set of components 506 may provide a delayed and inverted sample capture signal $V_{SW1}$ to an inverter 508, which inverter 508 has an output that tracks the output of the VS and $V_{SW1}$ nodes after a further delay. The delay $T_{PD}$ provided by the component or set of components 506 may be the same as, or different from, the delay $T_{PD}$ provided by the component or set of components 502. The inverter 508 may be configured to transition the voltage signal $V_{SW2}$ from high-to-low.

The output of the inverter 508 may be coupled to a clock input of a monostable circuit 510. The monostable circuit 510 may generate a stable output (e.g., a low voltage on node $V_{SW3}$ LV) between avalanche events of the avalanche diode 302, but may pulse its output (e.g., form low-to-high) in response to an avalanche event (e.g., when it detects a high-to-low transition at the output of the inverter 508. After a delay $T_{RCH}$ 512, the monostable circuit 510 may return the voltage on node $V_{SW3}$ LV to a low voltage).

In some embodiments, the output of the monostable circuit 510 may be connected to a level shifter circuit 514 that level shifts the output of the monostable circuit 510 to produce a level shifted signal $V_{SW3}$. For example, the level shifter circuit 514 may receive two different high voltage inputs (e.g., $V_{DD}$ and $V_E$) and shift the voltage domain of its output signal ($V_{SW3}$) as compared to the voltage domain of its input signal ($V_{SW3}$ LV).

In some embodiments, the switching signal $V_{SW1}$ and/or $V_{SW2}$ may be alternatively generated downstream from the monostable circuit 510.

In some embodiments, the delay circuit 500 or monostable circuit 510 may have one or more programmable delays (e.g., one or more delays that may be changed by a processor, by varying one or more parameters of an inverter, buffer, or other element, or by introducing or bypassing one or more inverters or buffers). The programmable delay(s) may determine the timing(s) of one or more of the switching signals $V_{SW1}$, $V_{SW2}$, and/or $V_{SW3}$.

Turning now to FIG. 6, examples of the sample and hold circuit 308 and analog buffer 310 described with reference to FIG. 3A are shown. For reference, FIG. 6 also shows the avalanche diode 302 of the breakdown voltage monitoring pixel 300 described with reference to FIG. 3A, but does not show the entirety of the breakdown voltage monitoring pixel 300.

As shown, the sample and hold circuit 308 may be configured as a track and hold circuit 308. The track and hold circuit 308 may include a normally open switch 600 that can be temporarily closed to connect the track and hold circuit 308 to the cathode 316 of the avalanche diode 302. When the track and hold circuit 308 is connected to the cathode 316 while the switch 610 is closed, the $V_{SPIX}$ node of the track and hold circuit 308 tracks the cathode voltage (VS). The switch 600 may in some cases include a transistor that is coupled between the cathode 316 and the $V_{SPIX}$ node 602 of the track and hold circuit 308 by its source and drain. The transistor's gate may receive the sample capture signal ($V_{SW1}$) described with reference to FIGS. 3 and 5. When the sample capture signal is pulsed, the switch 600 may be temporarily closed, and a sample of the cathode voltage (VS) may be stored in a storage element of the track and hold circuit 308. In some embodiments, the storage element may include a capacitor 604 ($C_{VSPIX}$). The capacitor 604 may be coupled between the $V_{SPIX}$ node 602 and another node 606 (or between the node 602 and ground).

In some embodiments, the track and hold circuit 308 may be coupled to a level shifter circuit 608 via the node 606. The level shifter circuit 608 may alternately couple the node 606 (and one terminal of the capacitor 604) to a first potential (e.g., ground) or a second potential (e.g., $V_{CM}$). In this manner, the voltage domain of a charge stored in the capacitor 604 may be level shifted from a first voltage domain to a second voltage domain. For example, the level shifter circuit 608 may include a first switch 610 (e.g., a first transistor) that may be closed when sampling the cathode voltage (VS), and a second switch 612 (e.g., a second transistor) that may be closed when reading the sample of the cathode voltage out of the sample and hold circuit 308. The first and second switches 610, 612 may be closed at different times. Between a first time period when the sample of the cathode voltage is acquired and a second time period when the sample of the cathode voltage is read out, both of the first and second switches 610, 612 may be open. In some embodiments, the first switch 610 may be operated by a non-level shifted switching signal ($V_{SW2}$) generated by the avalanche detector circuit 306, and the second switch 612 may be operated by a level shifted switching signal ($V_{SW3}$) generated by the avalanche detector circuit 306.

The analog buffer 310 may buffer and/or amplify the sample of the cathode voltage. In some embodiments, the analog buffer 310 may include an operational transconductance amplifier (OTA) 614 having a positive input terminal coupled to the node 602, and a negative input terminal coupled to its output terminal 616. The analog buffer 310 may be enabled by a pixel select signal (e.g., a pixel select signal, SELECTi, received by the OTA 614) to generate an output signal indicative of the charge stored by the capacitor 604 or other storage element. For example, with the switches 600 and 610 open and the switch 612 closed, the pixel select signal (SELECTi) may be driven to select the analog buffer 310, and the OTA 614 may amplify a voltage across the capacitor 604 to generate an output current indicative of the stored sample of the cathode voltage. The output current is based on a differential input voltage received by the OTA 614. The output may be generated at the output terminal 616 (VSOUT_BUS).

Embodiments of the avalanche diode control circuit 304, avalanche detector circuit 306, sample and hold circuit 308, and analog buffer 310 included in the breakdown voltage monitoring pixel 350 (FIG. 3B) may be configured the same as, or similarly to, the circuits of the same name shown in FIGS. 4-6.

Figure 7:
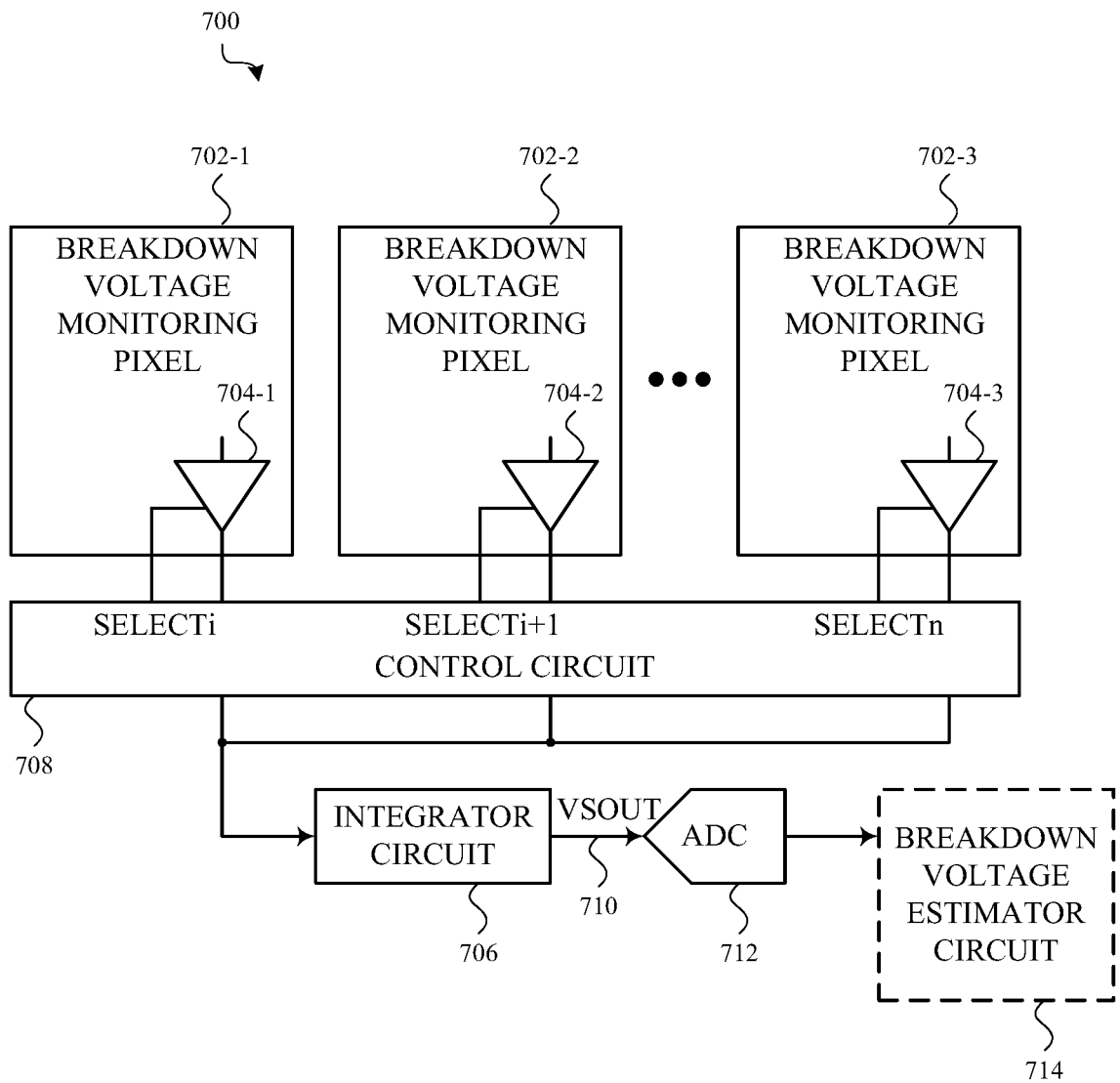
FIGS. 7 and 8 show examples of circuitry that may be used to collect samples of avalanche diode output voltages from an array of breakdown voltage monitoring pixels.
Figure 8:
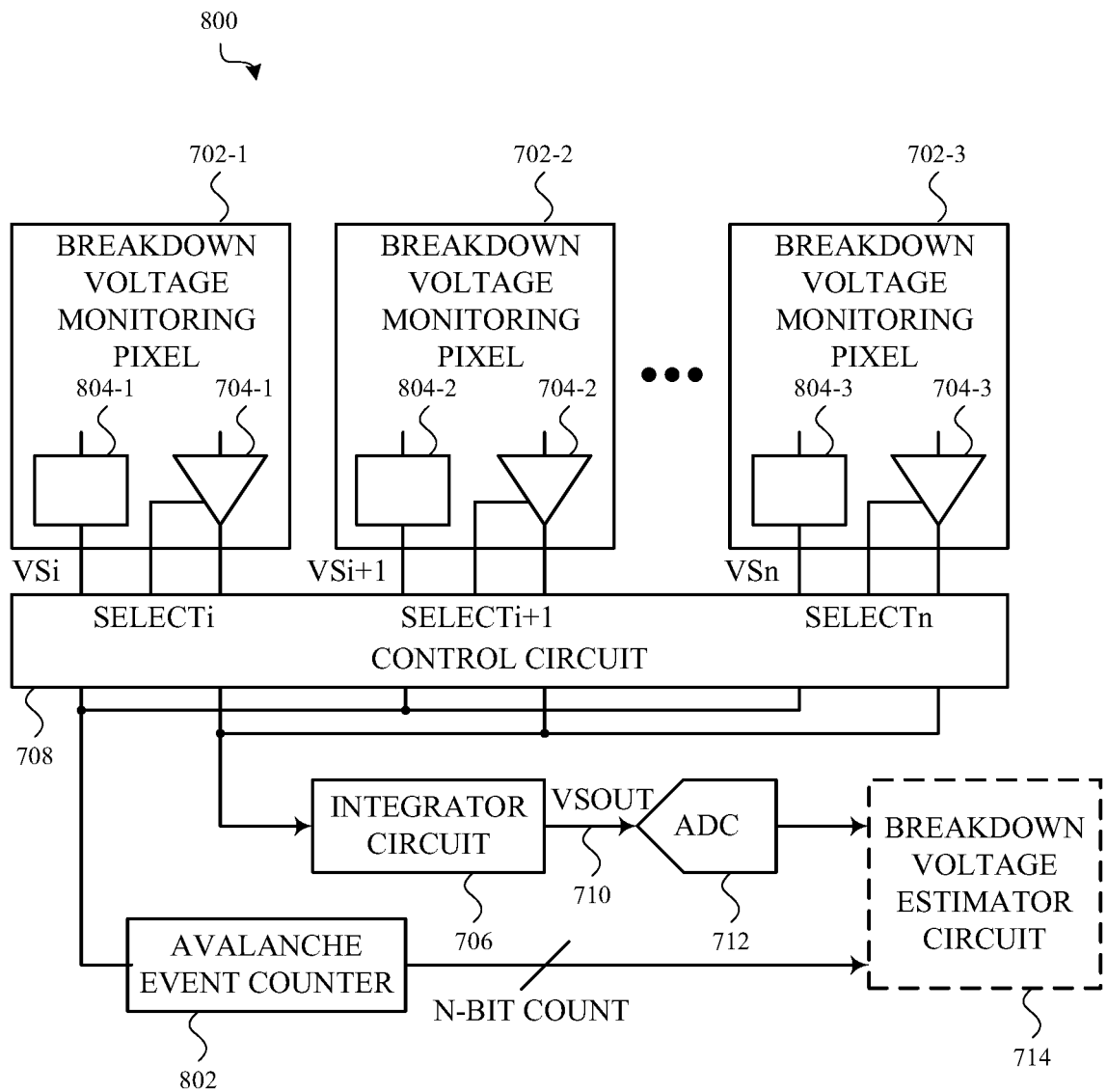

FIGS. 7 and 8 show examples of circuitry 700, 800 that may be used to collect samples of avalanche diode output voltages from an array of breakdown voltage monitoring pixels (e.g., pixels 702-1, 702-2, and 702-3). Each of the breakdown voltage monitoring pixels 702-1, 702-2, 702-3 may be configured similarly to the breakdown voltage monitoring pixel 300 described with reference to FIG. 3A or 3B, or in other ways. FIG. 8 shows additional circuitry that may be shared by the array of breakdown voltage monitoring pixels 702-1, 702-2, 702-3. The circuitry 700, 800 shown in FIGS. 7 and 8 may include an integrator circuit 706, which integrator circuit 706 is an example of the sample collection circuit 312 described with reference to FIGS. 3A and 3B.

The integrator circuit 706 may be coupled to each of the breakdown voltage monitoring pixels 702-1, 702-2, 702-3. For example, each of the breakdown voltage monitoring pixels 702-1, 702-2, 702-3 may include an analog buffer 704-1, 704-2, 704-3, and an input of the integrator circuit 706 may be coupled to an output of each of the analog buffers 704-1, 704-2, 704-3. Each of the analog buffers 704-1, 704-2, 704-3 may be configured the same as (or differently from) the analog buffer 310 described with reference to FIGS. 3A, 3B, and 6.

A control circuit 708 may be configured to separately address each of the breakdown voltage monitoring pixels 702-1, 702-2, 702-3. For example, the control circuit 708 may assert one of a plurality of pixel select signals (SELECTi, SELECTi+1, . . . , SELECTn) to enable an analog buffer 704-1, 704-2, 704-3 associated with one of the breakdown voltage monitoring pixels 702-1, 702-2, 702-3, thereby enabling the analog buffer to output a sample of an avalanche diode's output voltage to the integrator circuit 706 (i.e., the sample of the output voltage is output while the breakdown voltage monitoring pixel is addressed).

The pixel select signal for a particular breakdown voltage monitoring pixel 702-1, 702-2, or 702-3 may be asserted before each recharge of the pixel's avalanche diode, to transfer each sample of the avalanche diode's output voltage to the integrator circuit. Alternatively, the control circuit 708 may be configured to receive an output of the pixel's avalanche detector circuit, and the pixel select signal may be asserted after capturing a sample of the pixel's avalanche diode output voltage in response to detection of an avalanche event.

The integrator circuit 706 may integrate the samples of an avalanche diode's output voltage received for a particular breakdown voltage monitoring pixel 702-1, 702-2, or 702-3. More particularly, the integrator circuit 706 may integrate, for a particular breakdown voltage monitoring pixel, samples of an avalanche diode's output voltage obtained in response to avalanche events occurring during an exposure period of the avalanche diode. The exposure period is a time period over which the avalanche diode is recharged multiple times while being exposed to photons, so that the avalanche diode experiences multiple avalanche events, and multiple samples of the avalanche diode's output voltage subsequent to an avalanche event can be collected. The multiple recharges of the avalanche diode may include any number of recharges, and may be selected to be a statistically significant number of recharges.

The integrator circuit 706 may generate an output indicative of a magnitude of the integrated samples for a particular breakdown voltage monitoring pixel 702-1, 702-2, or 702-3. The output may be generated on a node 710 and received by an analog-to-digital converter (ADC) 712 that digitizes the output. In some embodiments, the integrator circuit 706 and ADC 712 may be adapted to form a sigma-delta ADC.

The output of the ADC 712 may be received by an optional breakdown voltage estimator circuit 714 (e.g., a logic circuit or processor) that is configured to estimate a breakdown voltage of the avalanche diode in the particular breakdown voltage monitoring pixel 702-1, 702-2, or 702-3 to which the ADC output corresponds. The breakdown voltage of the particular breakdown voltage monitoring pixel 702-1, 702-2, or 702-3 may in some cases serve as an estimate of the breakdown voltage of the avalanche diode(s) included in one or more imaging pixels of an imaging array. The imaging array may include all of the imaging pixels in an image sensor or a subset of the imaging pixels in an image sensor. In some embodiments, the estimated breakdown voltage of the particular breakdown voltage monitoring pixel may be combined with the estimated breakdown voltage(s) of one or more other breakdown voltage monitoring pixels (e.g., averaged) to estimate the breakdown voltage of the avalanche diode(s) included in one or more imaging pixels of an imaging array. In these embodiments, the control circuit 708 may be configured to individually address different ones of the breakdown voltage monitoring pixels 702-1, 702-2, or 702-3, and the integrator circuit 706 may collect and integrate samples of the output voltage of each pixel's avalanche diode. The different breakdown voltage monitoring pixels 702-1, 702-2, or 702-3 may be addressed sequentially or randomly, and all or a subset of the breakdown voltage monitoring pixels 702-1, 702-2, 702-3 may be addressed. A respective breakdown voltage may be estimated for each of the addressed breakdown voltage monitoring pixels, before breakdown voltages of the addressed breakdown voltage monitoring pixels are averaged or otherwise combined to estimate a breakdown voltage of one or more imaging pixels.

In some embodiments, the breakdown voltage estimator circuit 714 may indirectly estimate a breakdown voltage of an avalanche diode, or infer the value of the breakdown voltage, by estimating an average value ($V_{AVERAGE}$) of the avalanche diode's output voltage (VS) and determining an error ($V_{ERR}$) between the estimated output voltage ($V_{AVERAGE}$) and an expected output voltage ($V_{TARGET}$). This error is indicative of an avalanche diode's breakdown voltage because the output of the integrator circuit 706 (VSOUT) is a sum of the avalanche diode's breakdown voltage (VBD), less the absolute value of the avalanche diode's anode bias voltage (i.e., |VAD| in FIGS. 3 and 4), across a set of samples obtained for an exposure period of the avalanche diode (e.g., $VSOUT=\Sigma_{i=1}^{n} VBD-|VAD|$).

In alternative embodiments of the circuitry 700, the integrator circuit 706 and/or ADC 712 may be replicated such that each breakdown voltage monitoring pixel 702-1, 702-2, 702-3 has its own integrator circuit 706 and/or ADC 712.

FIG. 8 shows an alternative to the circuitry 700 described with reference to FIG. 7. In particular, the circuitry 800 shown in FIG. 8 includes an avalanche event counter 802 coupled to each of the breakdown voltage monitoring pixels 702-1, 702-2, 702-3. When a breakdown voltage monitoring pixel 702-1, 702-2, or 702-3 is addressed, the avalanche event counter 802 and control circuitry for the integrator circuit 706 may each receive a control signal from the breakdown voltage monitoring pixel 702-1, 702-2, or 702-3. For example, the avalanche event counter 802 and control circuitry for the integrator circuit 706 may each receive the output voltage (VS). Alternatively, the avalanche event counter 802 and control circuitry for the integrator circuit 706 may each receive a control signal generated by the avalanche detector circuit 804-1, 804-2, or 804-3. In some cases, the avalanche event counter 802 and control circuitry for the integrator circuit 706 may each receive a different control signal (e.g., the output voltage (VS) or one of the various control signals output by the avalanche detector circuit 804-1, 804-2, or 804-3).

An avalanche event counter may be configured to count a number of avalanche events occurring in an avalanche diode during an exposure period of the avalanche diode. In the case of the avalanche event counter 802, each time the avalanche diode output voltage, or s control signal received from an avalanche detector circuit 804-1, 804-2, or 804-3, makes a transition indicating that an avalanche event has occurred, the avalanche event counter 802 may increment a count. The count (e.g., an n-bit digital count) may be maintained for the duration of an exposure period of a pixel's avalanche diode, and reset after the count for the exposure period has been passed to other circuitry (e.g., the breakdown voltage estimator circuit 714).

When the integrator circuit 706 also receives the avalanche diode output voltage, or a control signal received from the avalanche detector circuit 804-1, 804-2, or 804-3, the integrator circuit 706 may integrate a sample of an avalanche diode output voltage only after an avalanche event has occurred. Although an avalanche event may be expected to occur each time an avalanche diode is recharged, there may be times when the avalanche diode is not exposed to photons (or a sufficient number of photons), and thus the avalanche diode does not experience an avalanche event before a next recharge cycle. Although the integrator circuit 706 would ideally integrate a "zero" sample for such a recharge cycle, dark current or other effects may cause the integrator circuit 706 to integrate something other than a "zero" sample for such a recharge cycle. Gating the input to the integrator circuit 706 based on the detection of an avalanche event prevents the integrator circuit 706 from integrating a non-zero sample when an avalanche event has not occurred.

The optional breakdown voltage estimator circuit 714 may estimate a breakdown voltage of an avalanche diode using the integrated samples of the avalanche diode output voltage (received from the integrator circuit 706) and the number of avalanche events (received from the avalanche event counter 802). For example, the breakdown voltage estimator circuit 714 may divide an indication of the magnitude of the integrated samples of the avalanche diode output voltage by the number of avalanche events to determine an average breakdown voltage of the avalanche diode over multiple avalanche events occurring in the avalanche diode over an exposure period. The breakdown voltage estimator circuit 714 may also average the average breakdown voltage determined for multiple breakdown voltage monitoring pixels 702-1, 702-2, 702-3. The average breakdown voltage for the avalanche diode(s) in one or more breakdown voltage monitoring pixels 702-1, 702-2, 702-3 may also serve as an estimate of the breakdown voltage for the avalanche diode(s) in one or more imaging pixels.

Figure 9:
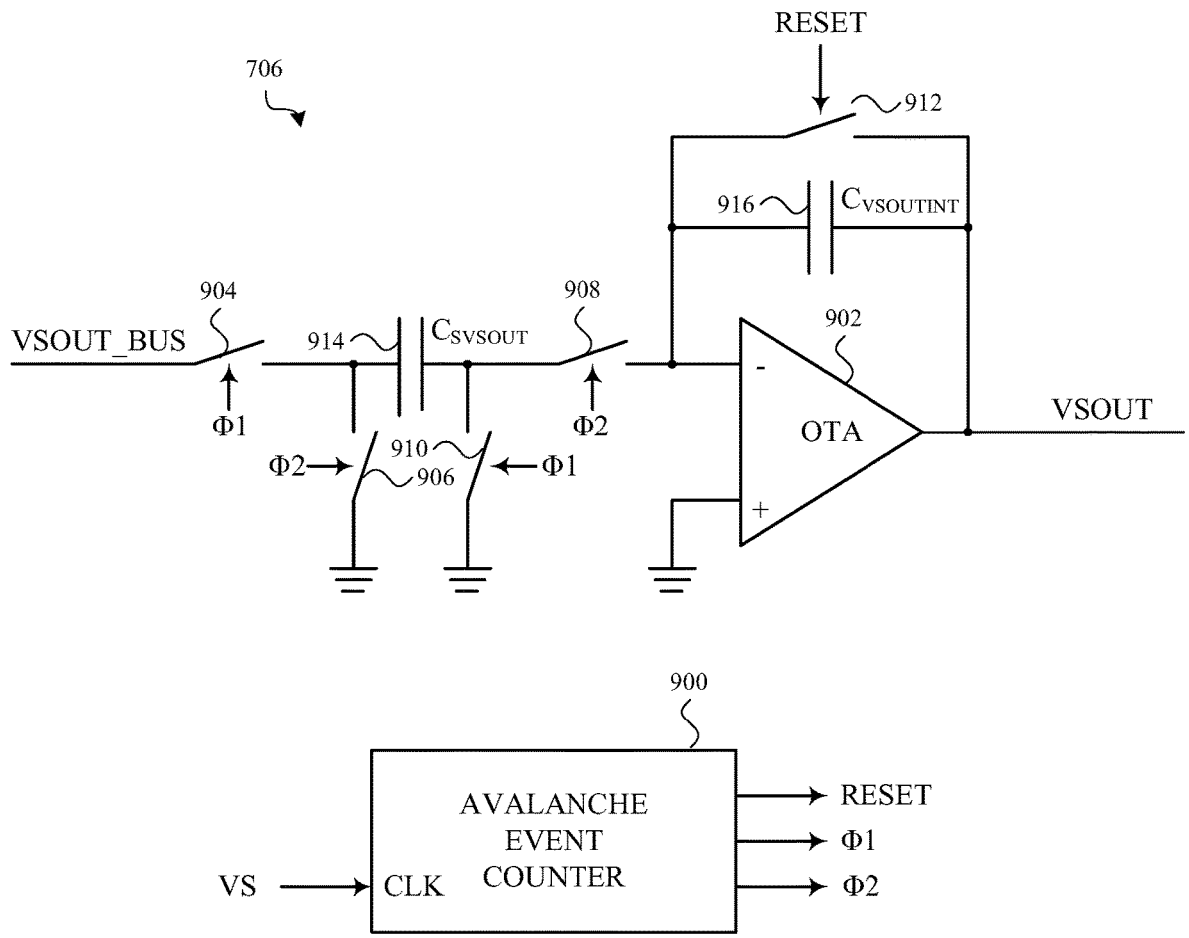
FIG. 9 shows an example of an integrator circuit that may be used in the circuitry shown in FIG. 7 or 8.

FIG. 9 shows an example of the integrator circuit 706 described with reference to FIGS. 7 and 8. Also shown is control circuitry 900 for the integrator circuit 706. By way of example, the integrator circuit 706 is shown to be a non-inverting, parasitic-insensitive, switched capacitor integrator circuit.

The control circuitry 900 may receive a control signal, such as the output voltage of a breakdown voltage monitoring pixel's avalanche diode, or a control signal generated by a breakdown voltage monitoring pixel's avalanche detector circuit. A transition of the output voltage (VS) from a high-to-low state is indicative of an avalanche event, and may be used to drive the generation of various switching signals (e.g., Φ1 and Φ2) and a reset signal (RESET). In operation, Φ1 may be temporarily asserted, then Φ2 may be temporarily asserted after Φ1 has been de-asserted, then RESET may be temporarily asserted after 12 has been de-asserted.

The integrator circuit 706 may include an OTA 902, a staging capacitor 914 ($C_{SVSOUT}$), an integration capacitor ($C_{VSOUTINT}$) 916, and a plurality of switches 904, 906, 908, 910, and 912. A first switch 904 may couple the output of analog buffer 310 (see, FIGS. 3A, 3B, and 6) to a first terminal of the staging capacitor 914, and a second switch 906 may couple the first terminal of the staging capacitor 914 to ground. A third switch 908 may couple a second terminal of the staging capacitor 914 to the negative input of the OTA 902, and a fourth switch 910 may couple the second terminal of the staging capacitor 914 to ground. The integration capacitor 916 may be coupled between the negative input terminal of the OTA 902 and the output of the OTA 902. A fifth switch 912 may be coupled in parallel with the integration capacitor 916.

In operation, the first through fifth switches 904-912 may be normally open. To integrate a sample of an avalanche diode output voltage with other samples of the output voltage, the first and fourth switches 904, 910 may be temporarily closed in response to Φ1 being asserted, and the sample of the output voltage may be transferred from the local storage element of a breakdown voltage monitoring pixel to the staging capacitor ($C_{SVSOUT}$) 914. The first and fourth switches 904, 910 may then be opened and the second and third switches 906, 908 may be closed in response to Φ2 being asserted, and the sample of the output voltage may be integrated with other samples (e.g., as an integrated charge on the integration capacitor ($C_{VSOUTINT}$) 916). The second and third switches 906, 908 may then be opened and the first and fourth switches 904, 910 closed to move another sample of the output voltage to the staging capacitor 914. After all samples of the output voltage are integrated, a signal representing the integrated samples may be read out of the integrator circuit 706 on node SFOUT (e.g., $$VSOUT[n] = VSOUT[n-1] + VSOUT\_BUS \times \frac{c_{VSOUT}}{c_{VSOUTINT}}).$$

The fifth switch 912 may then be closed in response to RESET being asserted, and the charge on $C_{VSOUTINT}$ may be cleared, thereby readying the integrator circuit 706 for use by another breakdown voltage monitoring pixel.

Figure 10:
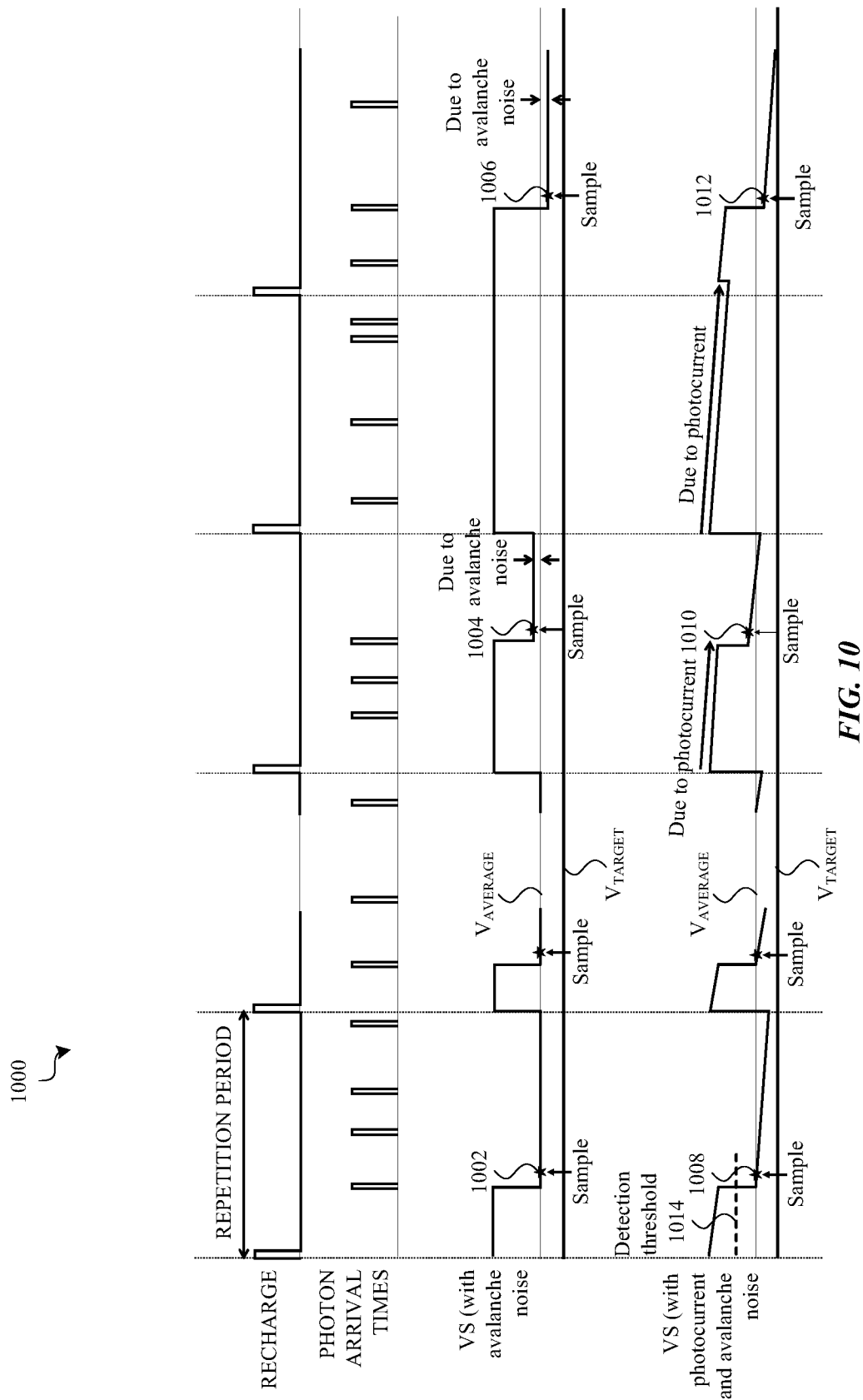
FIG. 10 is a timing diagram that illustrates the effects that avalanche noise and photocurrent (e.g., dark current) have on an avalanche diode's output voltage.

FIG. 10 is a timing diagram 1000 that illustrates the effects that avalanche noise and photocurrent (e.g., dark current) have on an avalanche diode's output voltage.

A recharge signal (RECHARGE), such as the recharge signal described with reference to FIG. 4, may be pulsed at the beginning of each of a plurality of repetition periods. A pulse of the recharge signal charges the cathode node (VS), as shown by the last two waveforms illustrated in FIG. 10. After the cathode node is charged, a corresponding avalanche diode is ready to detect photons.

A sequence of photons may impinge on an avalanche diode somewhat randomly with respect to the pulses of the recharge signal (e.g., at random photon arrival times). As shown in the two cathode node waveforms, an avalanche diode may experience an avalanche event, and the voltage on the cathode node may be discharged, after one or a few photons impinge on the avalanche diode.

The first avalanche diode output voltage waveform shown in FIG. 10 illustrates the effects of avalanche noise on the output voltage. At a first sample time 1002, following a first avalanche event, the output voltage (VS) drops to an average output voltage ($V_{AVERAGE}$). At a second sample time 1004, following another avalanche event, the output voltage drops to a voltage above the average output voltage. At a third sample time 1006, following yet another avalanche event, the output voltage drops to a voltage below the average output voltage. The difference in voltages obtained at different sample times 1002, 1004, 1006 represents a sampling error due to avalanche noise. This sampling error can be averaged out by averaging a statistically significant number of voltage samples (e.g., by determining an average VS output voltage ($V_{AVERAGE}$)).

The second avalanche diode output voltage waveform shown in FIG. 10 illustrates the effects of photocurrent (e.g., dark current), in combination with avalanche noise, on the output voltage. At a first sample time 1008, following a first avalanche event, the output voltage (VS) drops to an average output voltage, but then begins to drift (e.g., further drop). At a second sample time 1010, following another avalanche event, the output voltage drops to a voltage above the average output voltage, but again begins to drift. At a third sample time 1012, following yet another avalanche event, the output voltage drops to a voltage below the average output voltage, and again begins to drift. The effects of photocurrent (e.g., dark current) can be mitigated by sampling an avalanche diode's output voltage (VS) immediately after (or close to) a falling VS edge produced by an avalanche event. Otherwise, the output voltage drifts from the voltage that needs to be sampled and there is further error that cannot be averaged out. An avalanche detector circuit, such as the circuit described with reference to FIG. 5, enables sampling of the output voltage very close to an avalanche event.

As also shown in FIG. 10, and with reference to each of the VS waveforms, the difference between an expected avalanche diode output voltage ($V_{TARGET}$=VBD−|VAD|) and an actual (or average) avalanche diode output voltage ($V_{AVERAGE}$) represents an error ($V_{ERR}$=$V_{TARGET}$−

$V_{AVERAGE}$) that needs to be accounted for by adjusting or regulating the magnitude of a voltage supply (e.g., the high voltage supply, VAD) applied to an avalanche diode. $V_{TARGET}$ may or may not be zero volts (V). For example, $V_{TARGET}$ may be about 0.5 V in some examples. A control loop (e.g., a closed loop control loop) may be used to adjust VAD in response to $V_{ERR}$. When $V_{ERR}$=0 V, the adjustment or regulation of VAD has converged.

As shown with reference to the second avalanche diode output voltage waveform, an avalanche detection threshold 1014 (e.g., of an avalanche detector circuit) may be established at an intermediate voltage along a high-to-low change in the output voltage. A delay provided by an avalanche detector circuit, between detection of an avalanche event at the avalanche detection threshold 1014 and generation of a sample capture signal, can then be configured such that a sample time occurs immediately after (or very close to) the avalanche event.

Figure 11:
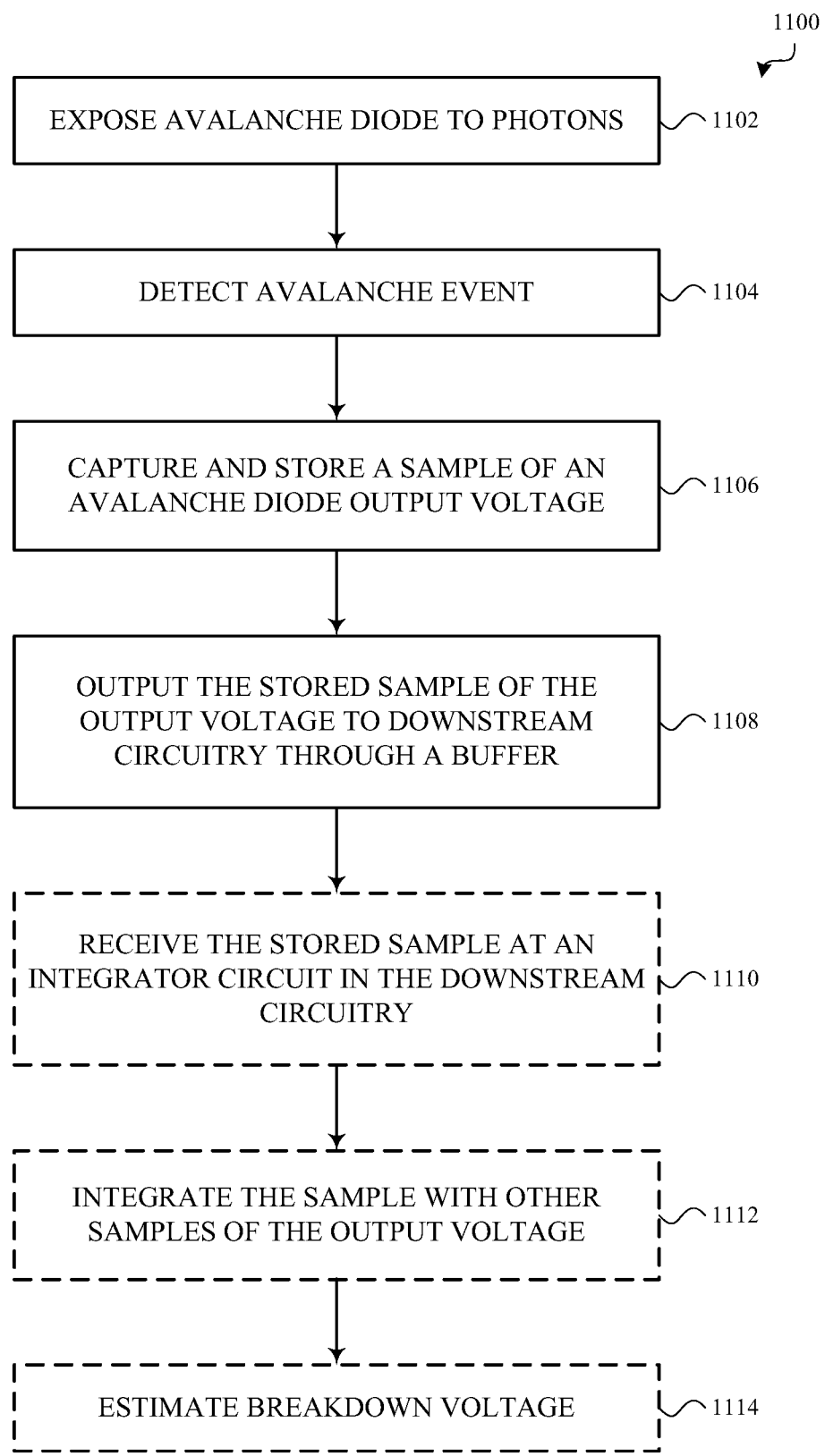
FIG. 11 illustrates an example method of monitoring an avalanche diode having an output voltage (e.g., to estimate the breakdown voltage of the avalanche diode)

FIG. 11 illustrates an example method 1100 of monitoring an avalanche diode having an output voltage (e.g., to estimate the breakdown voltage of the avalanche diode). The method 1100 may be performed by, or using, any of the breakdown voltage monitoring pixels, sample collection or integrator circuits, and/or breakdown voltage estimator circuits described herein. The method 1100 may also be performed by, or using, an imaging array, processor, or other components.

At block 1102, the method 1100 may include exposing the avalanche diode to photons. The avalanche diode may be exposed to the photons during an exposure period of the avalanche diode. Prior to the operation(s) at block 1102, the avalanche diode may be reverse-biased to a voltage that exceeds the breakdown voltage of the avalanche diode. In some embodiments, the biasing may be performed by the avalanche diode control circuit 304 described with reference to FIGS. 3A, 3B, and 4. In some embodiments, the avalanche diode may be a SPAD.

At block 1104, the method 1100 may include detecting an avalanche event that occurs in the avalanche diode in response to at least one of the photons impinging on the avalanche diode. In some embodiments, the operation(s) at block 1104 may be performed by the avalanche detector circuit 306 described with reference to FIGS. 3A, 3B, and 5.

At block 1106, the method 1100 may include capturing and storing a sample of the avalanche diode output voltage in response to detecting the avalanche event. In some embodiments, the operation(s) at block 1106 may be performed by the sample and hold circuit 308 described with reference to FIGS. 3A, 3B, and 6.

At block 1108, the method 1100 may include outputting the stored sample of the output voltage to downstream circuitry through a buffer. In some embodiments, the operation(s) at block 1108 may be performed by the analog buffer 310 described with reference to FIG. 3 or 6, under control of the control circuit 708 described with reference to FIGS. 7 and 8.

At block 1110, the method 1100 may optionally include receiving the stored sample at an integrator circuit in the downstream circuitry. In some embodiments, the operation(s) at block 1110 may be performed by the sample collection circuit 312 or integrator circuit 706 described with reference to FIGS. 3A, 3B, 7, and 8, under control of the control circuit 708 described with reference to FIG. 7 or 8.

At block 1112, the method 1100 may optionally include integrating the sample with other samples of the output voltage. The integrating may be performed in an analog domain. In some embodiments, the operation(s) at block 1112 may be performed using the sample collection circuit 312 or integrator circuit 706 described with reference to FIGS. 3A, 3B, 7, and 8.

In some embodiments of the method 1100, a series of multiple avalanche events may occur in the avalanche diode (e.g., a different avalanche event after each of a plurality of recharge cycles). In these embodiments, different samples of the output voltage may be captured and stored in response to detecting different avalanche events, and the integrator circuit may combine different samples that are captured during an exposure period of the avalanche diode. In some embodiments, the method 1100 may include counting a number of the multiple avalanche events, and estimating (at block 1114) a breakdown voltage of the avalanche diode using the integrated samples of the output voltage and the number of the multiple avalanche events.

In some embodiments of the method 1100, an avalanche event may be detected using a monostable circuit that responds to changes in the output voltage.

Figure 12:
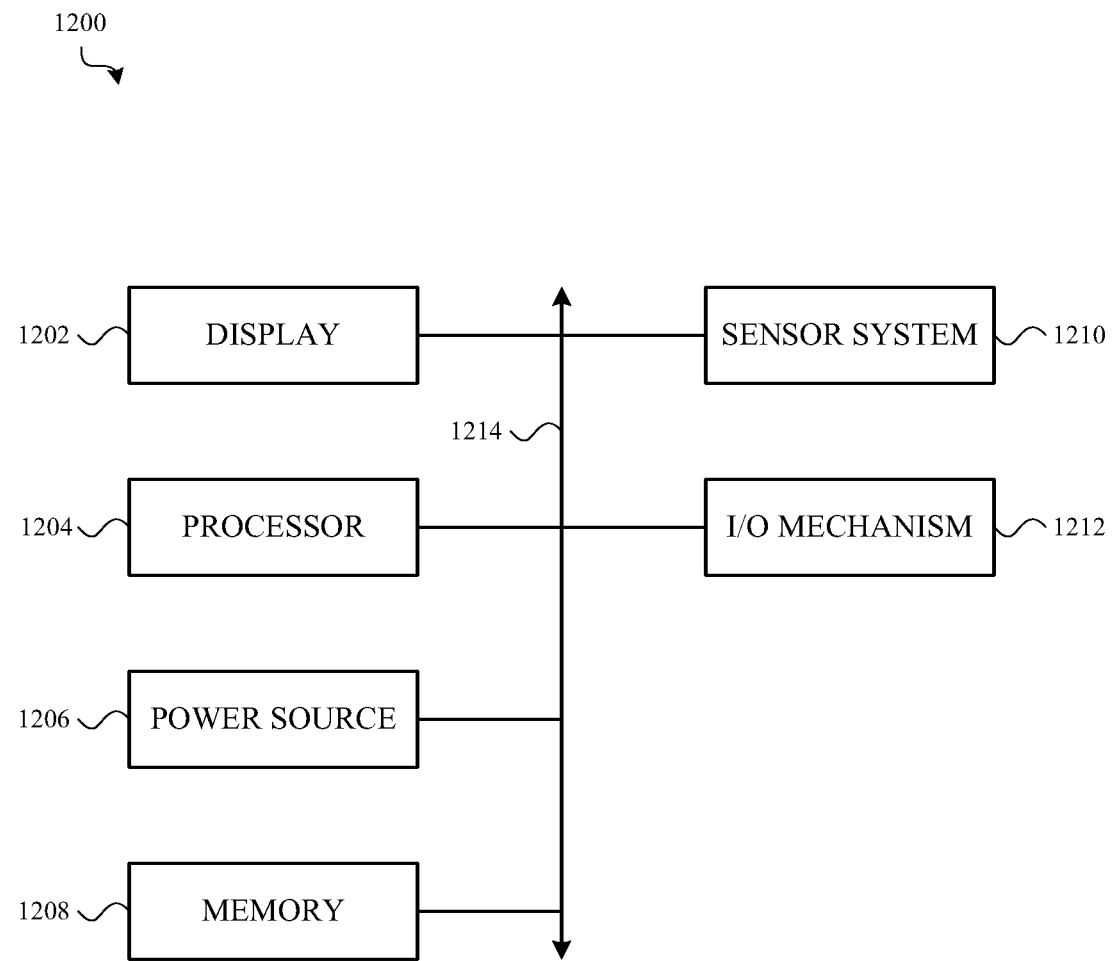
FIG. 12 shows a sample electrical block diagram of an electronic device that may include the detector or image sensor shown in FIG. 1 or 2.

FIG. 12 shows a sample electrical block diagram of an electronic device 1200 that includes a detector or image sensor, such as the detector or image sensor described with reference to FIG. 1 or 2. The electronic device 1200 may take forms such as a hand-held or portable device (e.g., a smart phone), a navigation system of a vehicle, and so on. The electronic device 1200 may include an optional display 1202 (e.g., a light-emitting display), a processor 1204, a power source 1206, a memory 1208 or storage device, a sensor system 1210, and an optional input/output (I/O) mechanism 1212 (e.g., an input/output device and/or input/output port). The processor 1204 may control some or all of the operations of the electronic device 1200. The processor 1204 may communicate, either directly or indirectly, with substantially all of the components of the electronic device 1200. For example, a system bus or other communication mechanism 1214 may provide communication between the processor 1204, the power source 1206, the memory 1208, the sensor system 1210, and/or the input/output mechanism 1212.

The processor 1204 may be implemented as any electronic device capable of processing, receiving, or transmitting data or instructions. For example, the processor 1204 may be a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

In some embodiments, the components of the electronic device 1200 may be controlled by multiple processors. For example, select components of the electronic device 1200 may be controlled by a first processor and other components of the electronic device 1200 may be controlled by a second processor, where the first and second processors may or may not be in communication with each other.

The power source 1206 may be implemented with any device capable of providing energy to the electronic device 1200. For example, the power source 1206 may include one or more disposable or rechargeable batteries. Additionally or alternatively, the power source 1206 may include a power connector or power cord that connects the electronic device 1200 to another power source, such as a wall outlet.

The memory 1208 may store electronic data that may be used by the electronic device 1200. For example, the memory 1208 may store electrical data or content such as, for example, audio and video files, documents and applications, device settings and user preferences, timing signals, control signals, data structures or databases, image data, maps, or focus settings. The memory 1208 may be configured as any type of memory. By way of example only, the memory 1208 may be implemented as random access memory, read-only memory, Flash memory, removable memory, other types of storage elements, or combinations of such devices.

The electronic device 1200 may also include one or more sensors defining the sensor system 1210. The sensors may be positioned substantially anywhere on the electronic device 1200. The sensor(s) may be configured to sense substantially any type of characteristic, such as but not limited to, touch, force, pressure, light, heat, movement, relative motion, biometric data, distance, and so on. For example, the sensor system 1210 may include a touch sensor, a force sensor, a heat sensor, a position sensor, a light or optical sensor, an accelerometer, a pressure sensor (e.g., a pressure transducer), a gyroscope, a magnetometer, a health monitoring sensor, an image sensor, and so on. Additionally, the one or more sensors may utilize any suitable sensing technology, including, but not limited to, capacitive, ultrasonic, resistive, optical, ultrasound, piezoelectric, and thermal sensing technology. In some embodiments, the sensor(s) may include the detector or image sensor described with reference to FIG. 1 or 2.

The I/O mechanism 1212 may transmit and/or receive data from a user or another electronic device. An I/O device may include a display, a touch sensing input surface such as a track pad, one or more buttons (e.g., a graphical user interface "home" button, or one of the buttons described herein), one or more cameras, one or more microphones or speakers, one or more ports such as a microphone port, and/or a keyboard. Additionally or alternatively, an I/O device or port may transmit electronic signals via a communications network, such as a wireless and/or wired network connection. Examples of wireless and wired network connections include, but are not limited to, cellular, Wi-Fi, Bluetooth, IR, and Ethernet connections. The I/O mechanism 1212 may also provide feedback (e.g., a haptic output) to a user.

The foregoing description, for purposes of explanation, uses specific nomenclature to provide a thorough understanding of the described embodiments. However, it will be apparent to one skilled in the art, after reading this description, that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art, after reading this description, that many modifications and variations are possible in view of the above teachings.

What is claimed is:

1. An image sensor, comprising:
an avalanche diode having an output voltage that changes in response to an avalanche event in the avalanche diode;
an avalanche detector circuit configured to generate a sample capture signal in response to detecting the avalanche event;
a sample and hold circuit configured to store a sample of the output voltage in response to receiving the sample capture signal; and
a sample collection circuit configured to collect the sample of the output voltage from the sample and hold circuit.

2. The image sensor of claim 1, further comprising:
a breakdown voltage estimator circuit configured to estimate a breakdown voltage of the avalanche diode in response to samples collected by the sample collection circuit.

3. The image sensor of claim 1, wherein the sample collection circuit is configured to integrate samples of the output voltage collected for an exposure period of the avalanche diode, the exposure period spanning multiple avalanche events in the avalanche diode.

4. The image sensor of claim 3, further comprising:
an avalanche event counter configured to count a number of avalanche events in the avalanche diode during the exposure period; wherein:
the sample collection circuit is configured to integrate samples of the output voltage received from the sample and hold circuit over an exposure period including multiple avalanche events in the avalanche diode; and
the breakdown voltage estimator circuit is configured to estimate the breakdown voltage of the avalanche diode using the integrated samples of the output voltage and the number of avalanche events.

5. The image sensor of claim 1, wherein the avalanche diode is a single-photon avalanche diode (SPAD).

6. The image sensor of claim 1, wherein the avalanche detector circuit comprises a monostable circuit that generates a pulse in response to the avalanche event.

7. The image sensor of claim 6, wherein the monostable circuit has a programmable delay.

8. The image sensor of claim 1, further comprising:
a level shifter circuit coupled to the sample and hold circuit; wherein:
control signals received by the level shifter circuit, from the avalanche detector circuit, level shift the sample of the output voltage stored in the sample and hold circuit.

9. The image sensor of claim 1, wherein the sample and hold circuit comprises a capacitor configured to store the sample of the output voltage.

10. An image sensor, comprising:
an array of imaging pixels including avalanche diodes;
an array of breakdown voltage monitoring pixels including avalanche diodes;
an integrator circuit coupled to each of the breakdown voltage monitoring pixels;
a breakdown voltage estimator circuit; and
a control circuit configured to address a first breakdown voltage monitoring pixel in the array of breakdown voltage monitoring pixels, the first breakdown voltage monitoring pixel comprising a first avalanche diode having a first output voltage; wherein:
while the first breakdown voltage monitoring pixel is addressed, the integrator circuit is configured to integrate samples of the first output voltage obtained in response to avalanche events occurring during an exposure period of the first avalanche diode; and
the breakdown voltage estimator circuit is configured to estimate a breakdown voltage of the avalanche diodes of the imaging pixels using the integrated samples of the first output voltage.

11. The image sensor of claim 10, further comprising:
an avalanche event counter coupled to each of the breakdown voltage monitoring pixels; wherein:
while the first breakdown voltage monitoring pixel is addressed, the avalanche event counter is configured to count a number of avalanche events in the first avalanche diode during the exposure period; and the breakdown voltage estimator circuit is further configured to estimate the breakdown voltage of the avalanche diodes of the imaging pixel using the number of avalanche events.

12. The image sensor of claim 10, wherein:

the control circuit is configured to individually address at least two of the breakdown voltage monitoring pixels in the array of breakdown voltage monitoring pixels;

the breakdown voltage estimator circuit is configured to estimate a respective breakdown voltage of each of the at least two breakdown voltage monitoring pixels; and the breakdown voltage estimator circuit is configured to estimate the breakdown voltage of the avalanche diodes of the imaging pixels using the respective breakdown voltages of the at least two breakdown voltage monitoring pixels.

13. The image sensor of claim 10, wherein each breakdown voltage monitoring pixel comprises an analog buffer positioned between a sample and hold circuit of the breakdown voltage monitoring pixel and the integrator circuit.

14. The image sensor of claim 10, wherein the avalanche diodes of the imaging pixels and the breakdown voltage monitoring pixels are single-photon avalanche diodes (SPADs).

15. A method of monitoring an avalanche diode having an output voltage, comprising:

exposing the avalanche diode to photons;

detecting an avalanche event that occurs in the avalanche diode in response to at least one of the photons impinging on the avalanche diode;

capturing and storing a sample of the output voltage in response to detecting the avalanche event; and outputting the stored sample of the output voltage to downstream circuitry through a buffer.

16. The method of claim 15, further comprising:

receiving the stored sample at an integrator circuit in the downstream circuitry; and integrating the stored sample with other samples of the output voltage.

17. The method of claim 16, wherein the integration is performed in an analog domain.

18. The method of claim 17, wherein:

the avalanche diode is exposed to the photons during an exposure period of the avalanche diode;

a series of multiple avalanche events occurs in the avalanche diode;

different samples of the output voltage are captured and stored in response to detecting different avalanche events; and the integrator circuit combines the different samples captured during the exposure period.

19. The method of claim 18, further comprising:

counting a number of the multiple avalanche events; and estimating a breakdown voltage of the avalanche diode using the integrated samples of the output voltage and the number of the multiple avalanche events.

20. The method of claim 15, wherein the avalanche event is detected using a monostable circuit that responds to changes in the output voltage.

* * * * *